(12) United States Patent
Lindblade et al.

(10) Patent No.: US 8,950,349 B2
(45) Date of Patent: Feb. 10, 2015

(54) REPLACEABLE ROLLER BEARING

(75) Inventors: Stephen P. Lindblade, Waller, TX (US); William Louis Fontenot, Houston, TX (US); James Nelson Pratt, Houston, TX (US)

(73) Assignee: SOFEC, Inc., Houston, TX (US)

( * ) Notice: Subject to any disclaimer, the term of this patent is extended or adjusted under 35 U.S.C. 154(b) by 65 days.

(21) Appl. No.: 13/588,959

(22) Filed: Aug. 17, 2012

(65) Prior Publication Data

US 2014/0050428 A1 Feb. 20, 2014

(51) Int. Cl.
| | |
|---|---|
| B63B 21/00 | (2006.01) |
| B63B 22/02 | (2006.01) |
| B63B 21/50 | (2006.01) |

(52) U.S. Cl.
CPC .................................. *B63B 21/507* (2013.01)
USPC ................. 114/230.12; 114/230.13

(58) Field of Classification Search
USPC .................... 114/230.12, 230.13; 441/3, 4, 5; 384/455
See application file for complete search history.

(56) References Cited

U.S. PATENT DOCUMENTS

| | | | |
|---|---|---|---|
| 4,698,038 A | 10/1987 | Key et al. | |
| 4,701,143 A | 10/1987 | Key et al. | |
| 4,753,553 A | 6/1988 | Carlsen et al. | |
| 4,841,895 A | 6/1989 | Brewerton | |
| 4,955,310 A | 9/1990 | Pollack | |
| 5,240,446 A | 8/1993 | Boatman et al. | |
| 5,292,271 A | 3/1994 | Boatman et al. | |
| 5,316,509 A | 5/1994 | Boatman et al. | |
| 5,356,321 A | 10/1994 | Boatman et al. | |
| 5,359,957 A | 11/1994 | Askestad | |
| 5,372,531 A | 12/1994 | Boatman et al. | |
| 5,381,750 A | 1/1995 | Pollack | |
| 5,746,148 A | 5/1998 | Delago | |
| 5,762,017 A | 6/1998 | Groves | |
| 5,839,387 A | 11/1998 | Myklebust | |
| 5,860,382 A | 1/1999 | Hobdy | |
| 5,893,784 A | 4/1999 | Boatman | |
| 5,957,076 A | 9/1999 | Pollack et al. | |

(Continued)

FOREIGN PATENT DOCUMENTS

| | | |
|---|---|---|
| EP | 1889779 A1 | 2/2008 |
| EP | 2404821 A1 | 1/2012 |

OTHER PUBLICATIONS

International Search Report of corresponding counterpart international application No. PCT/US2013/055627 dated Jan. 8, 2014.

*Primary Examiner* — Stephen Avila
*Assistant Examiner* — Anthony Wiest
(74) *Attorney, Agent, or Firm* — Gary L. Bush; Andrews Kurth LLP

(57) ABSTRACT

A turret/vessel bearing arrangement and method for replacing bearings in situ without removing other bearings. The bearings are capable of being separated. A removable axial spacer secures the vessel and the turret into engagement with the upper and lower thrust bearings. Removal of the spacer allows increased separation between vessel and turret flanges that sandwich the thrust bearings. The mid radial bearing assembly includes one or more radially arranged bearing pads that allow for limited axial displacement of the turret with respect to the vessel during thrust bearing replacement while still bearing radial loads and allowing rotation. The addition of a temporary thrust bearing allows the vessel to weathervane about the turret while thrust bearing are replaced in situ.

43 Claims, 17 Drawing Sheets

(56) References Cited

U.S. PATENT DOCUMENTS

| | | |
|---|---|---|
| 6,164,233 A | 12/2000 | Pollack et al. |
| 6,263,822 B1 | 7/2001 | Fontenot et al. |
| 6,269,762 B1 | 8/2001 | Commandeur |
| 6,347,598 B1 | 2/2002 | Fontenot et al. |
| 6,477,974 B2 | 11/2002 | Hobdy |
| 6,708,639 B2 | 3/2004 | Cottrell et al. |
| 6,827,493 B2 | 12/2004 | Hooper |
| 6,990,917 B2 | 1/2006 | Boatman et al. |
| 7,063,032 B2 | 6/2006 | Lindblade et al. |
| 7,225,749 B2 | 6/2007 | Boatman |
| 7,347,156 B2 | 3/2008 | Lindblade |
| 7,451,718 B2 | 11/2008 | Boatman et al. |
| 7,510,452 B2 | 3/2009 | Van Tol et al. |
| 8,197,293 B2 | 6/2012 | Gooijer et al. |
| 2009/0324151 A1 | 12/2009 | Craig et al. |
| 2010/0012010 A1 | 1/2010 | Gooijer et al. |

US 8,950,349 B2

REPLACEABLE ROLLER BEARING

BACKGROUND OF THE INVENTION

1. Field of the Invention

This invention relates to a turret structure for vessels such as offshore drilling or production vessels, and more particularly to a turret bearing arrangement that can be replaced in situ.

2. Background Art

Vessel mooring systems are known in the art in which a vessel may weathervane about a turret that is moored to the sea floor. The turret extends through a moon pool or cylindrical opening that extends through the hull of the vessel. The vessel is supported for rotation with respect to the turret by bearing structures placed between the turret and the vessel. Horizontal and vertical bearings transfer horizontal and vertical loads between the turret and the vessel.

FIG. 1 discloses such a turret mooring system, which is more fully described in co-pending U.S. patent application Ser. No. 13/446,857 filed on Apr. 13, 2012 in the names of Lindblade et al., which is incorporated herein by reference. FIG. 1 shows the bow of a vessel 10 having a well or moon pool 12 extending through the hull of vessel 10. Mounted within well or moon pool 12 is a turret generally indicated at 14 about which vessel 10 may weathervane. Well 12 is normally of a circular cross section, and turret 14 is typically of a cylindrical shape to fit within well 12. Anchor legs 16 are connected to turret 14 and may be secured to the sea bed by suitable anchors to restrict rotation of turret 14. Risers 18 extend to subsea wellheads or distribution facilities on the sea floor and are connected to turret 14. A manifold deck 20 is supported on the upper end of turret 14 and includes valves connected to risers 18. A swivel stack shown generally at 22 extends upwardly from turret 14 and manifold deck 20 and allows fluids to be transferred from the turret 14 to the vessel 10. Turret 14 is rotatively supported on vessel 10 by an upper bearing assembly 2 and an optional lower bearing assembly 15.

FIG. 2 discloses a turret upper bearing assembly of the rail and wheel variety, which is known in the art. Downward axial loads are transferred from the turret to the vessel using one or more rows of wheels 62 that run between rails 60 mounted on the vessel and rails 42 mounted on the turret. Wheels 62 includes inner and outer flanges that lip over the upper and lower rails to keep the wheels coaxially engaged with the rails. Radial loads are transferred from the turret to the vessel using circular rail 38 which is in contact with a circumferential arrangement of wheels 35 mounted on spring packs 74. Any uplift loads are transferred from the turret to the vessel using flanged wheels 70 that run between rails 40 mounted on the turret and rails 66 mounted on the vessel. In some applications, bogey wheel assemblies may be used in place of conventional wheels for the axial bearings, such as in an arrangement disclosed in U.S. Pat. No. 6,269,762 issued on Aug. 7, 2001 to Commandeur, which is incorporated herein by reference. In bogey wheel arrangements, the faces of the wheels only bear against a single rail; the wheel axles are mounted in pivoting carriers and form part of the path of components through which force is transferred.

Wheel and rail bearing assemblies, such as shown in FIG. 2 or in the Commandeur patent, are bulky and somewhat restricted in their load capacity. In addition, wheel and rail bearings are typically not sealed but are instead exposed to the harsh elements of the sea environment. This characteristic means that these bearings are subject to corrosion and failure and therefore require regular maintenance. The obverse side of this coin and one of the main advantages of wheel and rail bearings, however, is that wheels or rail sections can be individually replaced in-situ.

An alternative to the wheel and rail type bearing assembly that is known in the art is an integrated three-row roller bearing assembly. An example of such a bearing assembly is shown in FIG. 3 and is described in U.S. Pat. No. 5,893,784 issued in Apr. 13, 1999 to Boatman, which is incorporated herein by reference. The three-row roller bearing assembly 80 includes a circular array of rollers 82 radially aligned about turret 14 for supporting the turret weight. Any uplifting turret force is resisted by a second set of radially aligned rollers 84. A third set of rollers 86, coaxially aligned about turret 14, serve to transfer radial loads between vessel 10 and turret 14. Only one of each roller 82, 84, and 86 is visible in FIG. 3. Rollers 82, 84, 86 differ from the wheels of wheel and rail bearings in that they are flangeless and are typically characterized by an axial length equal to or greater than the diameter. All three bearing rows 82, 84, 86 of the three-row roller bearing assembly 80 are preferably lubricated and sealed within a common volume by seals 88, 89 to provide protection from the elements and prevent corrosion. The large number of rollers also result in a load bearing capacity that is superior to that of a wheel and rail bearing of the same diameter.

The integrated three-row roller bearing is a precise assembly that requires a high degree of flatness for proper load distribution and is somewhat intolerant of distortions and deflections, which cause high point loading stresses on select rollers. Accordingly, the integrated three-row roller bearing is typically bolted to the vessel via a spring mounting system (see FIG. 1 of the Boatman patent, for example) so as to isolate the bearing from vessel deformations due to wind, waves, currents, and loading.

A primary disadvantage of three-row roller bearings is that large roller bearings are manufactured offsite and are installed as complete units in the shipyard when the turret assembly and moon pool are constructed. As such, roller bearing components have heretofore not been replaceable in situ as have been wheel and rail bearing components. Although this has not typically been a problem, because the on-station service life of FPSO vessels is extending into multiple decades, owners of such systems are demanding in-situ replacement of the bearings.

3. Identification of Objects of the Invention

A principal object of the invention is to provide a turret bearing for a mooring turret system that combines the advantages of higher load capacity, increased reliability, and sealed environment characteristic of the integrated three-row roller bearing with the advantage of in situ replacement characteristic of wheel and rail bearings.

That is, an object of the invention is to provide a turret bearing that allows in situ replacement of its components;

Another object of the invention is to provide a turret bearing with a high load capacity; and Another object of the invention is to provide a turret bearing with components that are sealed, enclosed and lubricated.

SUMMARY OF THE INVENTION

In a preferred embodiment, a turret is rotatively coupled within a moon pool of a vessel by a bearing system including three discrete bearings, at least one of which is a sealed axial thrust roller bearing for supporting the weight of the turret, risers, and mooring lines. The novel bearing arrangement includes a lower main support thrust roller bearing, a mid radial bearing, which may be a plain bearing or a roller bearing radially supported by plain bearing pads, and an upper retaining thrust bearing, which may be a roller or a plain bearing, for example. The upper and lower thrust bearings maintain the turret in axial alignment within the moon pool while the radial bearing maintains the relative radial position of the turret within the moon pool. Each bearing assembly of the present invention is preferably capable of being segmented and is designed to be replaced in situ individually.

A removable axial spacer secures the vessel and the turret into engagement with the upper and lower thrust bearing assemblies. Removal of the spacer allows increased separation between the vessel and turret flanges that sandwich the thrust bearings. The mid radial bearing assembly includes one or more radially arranged bearing pads that allow for limited axial displacement of the turret with respect to the vessel during thrust bearing replacement while still transferring radial loads and allowing rotation. The addition of a temporary thrust bearing allows the vessel to weathervane about the turret while main thrust bearing components are replaced in situ.

BRIEF DESCRIPTION OF THE DRAWINGS

The invention is better understood by reading the detailed description of embodiments which follow and by examining the accompanying drawings, in which.

Figure 1:
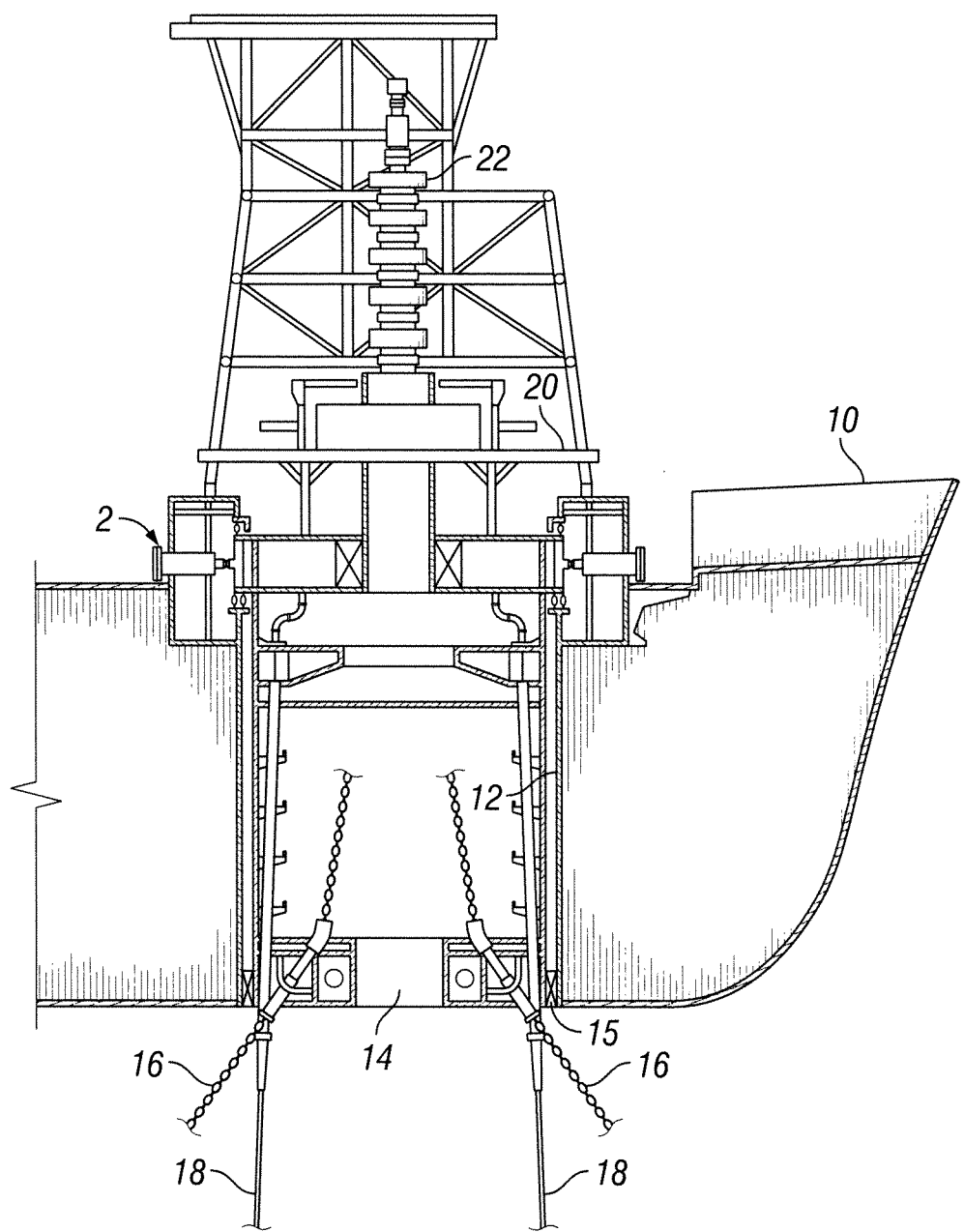
FIG. 1 is an elevation in longitudinal cross-section of the bow of a vessel including a turret installed in a well in the bow as is known in the art.
Figure 2:
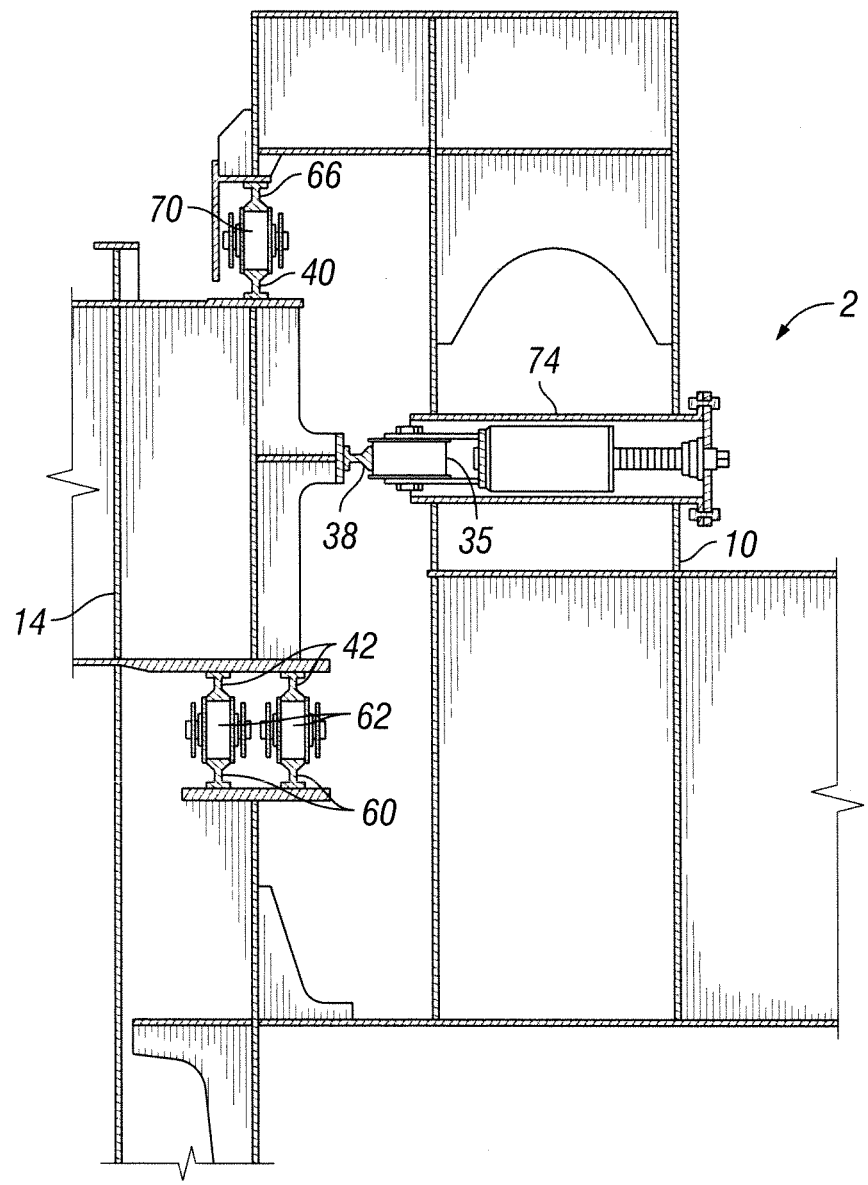
FIG. 2 is an elevation in longitudinal cross-section of an upper bearing assembly of prior art for rotatively coupling a turret within a moon pool of a vessel, showing upper and lower wheel and rail thrust bearings and a mid wheel and rail radial bearing disposed between the turret and the vessel to permit weathervaning of the vessel about the turret.
Figure 3:
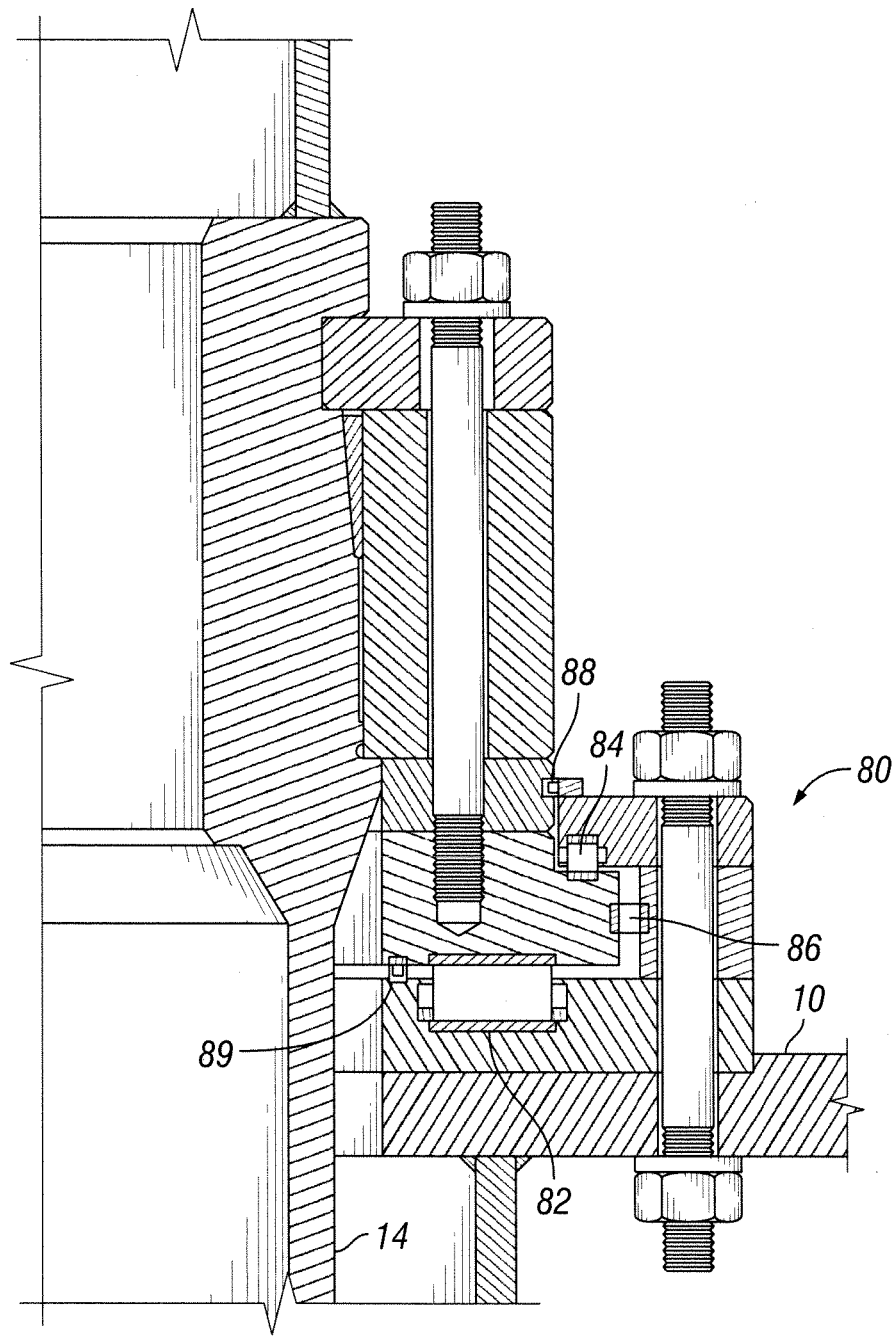
FIG. 3 is an elevation in longitudinal cross-section of an integrated three-row roller bearing assembly of prior art for rotatively coupling a turret within a moon pool of a vessel, showing upper and lower arrangements of radially aligned rollers for transferring axial forces and a mid coaxial arrangement of rollers for transferring radial loads all collocated within a single sealed, lubricated volume.

DESCRIPTION OF PREFERRED
EMBODIMENTS OF THE INVENTION

The aspects, features, and advantages of the invention mentioned above are described in more detail by reference to the drawings wherein like reference numerals represent like elements.

Figure 4:
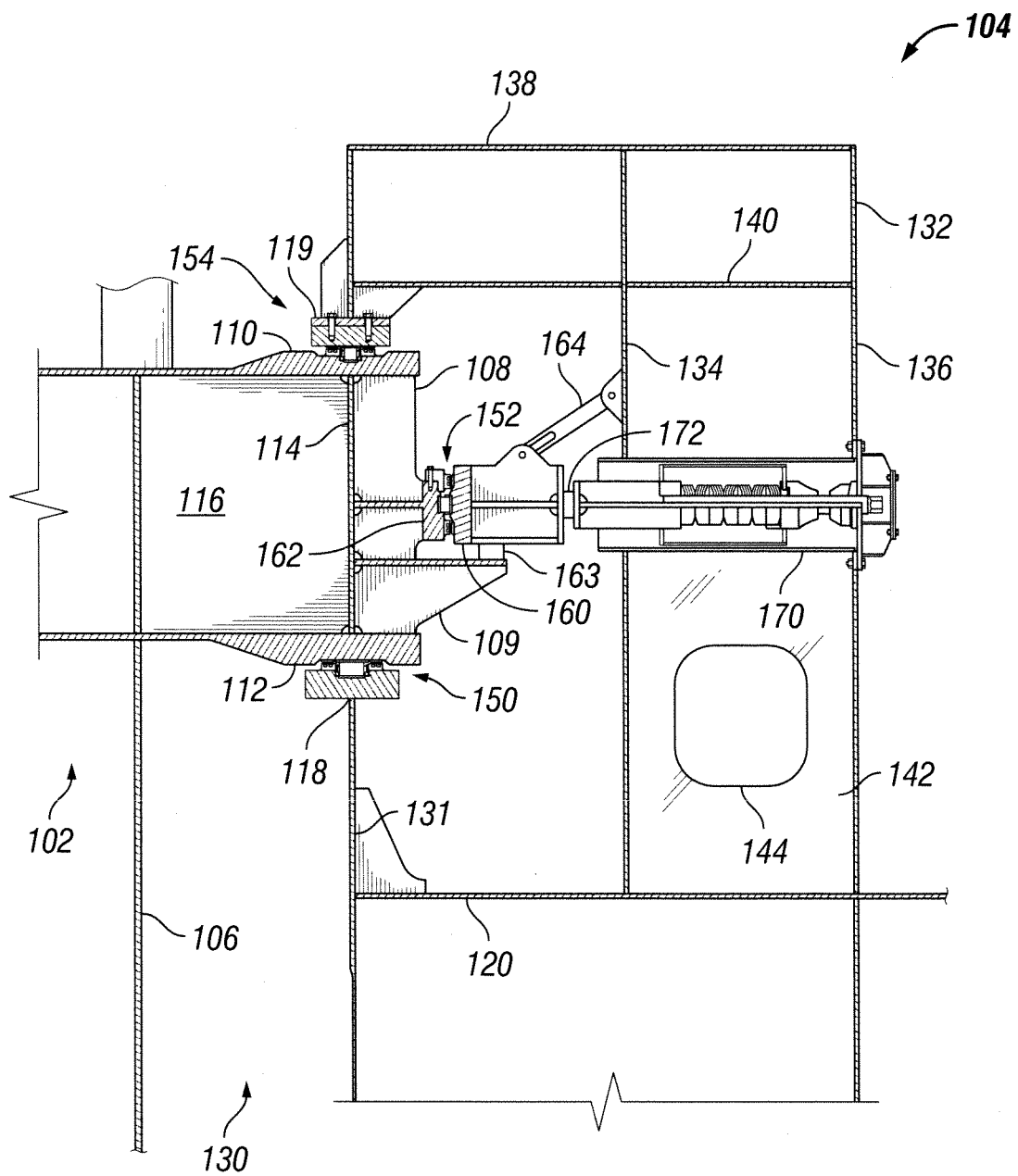
FIG. 4 is a detailed elevation in longitudinal cross-section of a portion the bow of a vessel including a turret installed in a moon pool according to a first embodiment of the invention, showing discrete upper and lower thrust bearings and a mid radial bearing, all of the roller-bearing variety, with the outer ring of the mid roller bearing being carried by the turret.

FIG. 4 shows an elevation view of a vessel-turret bearing arrangement according to an embodiment of the present invention, including radial and thrust bearings between a turret 102 and a vessel 104, which permit weathervaning of the vessel 104 about the turret. The bow of vessel 104 includes a moon pool 130 extending through the hull of vessel 10 which is defined by moon pool bulkhead 131. Turret 102 is mounted within moon pool 130.

Turret 102 includes a cylindrical body 106 having an upper radial extension or arm 108 including upper and lower of circular flanges 110, 112 extending outwardly from and coaxial with the cylindrical body 106 of turret 102. A vertical circular web 114, which is concentric with body 106, reinforces flanges 110 and 112. Radial reinforcing webs 116 are secured between cylindrical body 106 and circular web 114.

Vessel 104 includes a turret support structure 132 that is fixed to a deck 120 of vessel 10 and includes a pair of concentric rings 134 and 136 that extend upward vertically from deck 120 and an upper circular cover plate 138 that extends between outer concentric ring 136 and moon pool bulkhead 131. Turret support structure 132 also includes one or more horizontal stiffeners 140 disposed between outer concentric ring 136 and moon pool bulkhead 131, and one or more radial webs 142 are secured between concentric rings 134 and 136. Any of the webs or stiffeners of turret 102 or vessel 104 may include lightening holes as appropriate, such as lightening hole 144 in lightened web 142.

In a first embodiment, turret 102 is rotatively coupled within moon pool 130 by an arrangement of three discrete roller bearing assemblies, including a lower main support thrust roller bearing 150, a mid radial roller bearing 152, and an upper retaining thrust roller bearing 154. Each of the roller bearings 150, 152, 154 is preferably individually lubricated and sealed. The upper and lower thrust bearings 154, 150 maintain turret 102 in axial alignment within moon pool 130. The radial bearing 152 maintains the relative radial position of turret 102 within moon pool 130. Unlike an integrated three-row roller bearing assembly of prior art, the roller bearings 150, 152, 154 of the present invention are preferably capable of being individually segmented, and at least the main thrust bearing 150 is preferably arranged and designed to be replaced in situ, as described below with respect to FIGS. 13 and 14.

Figure 13:
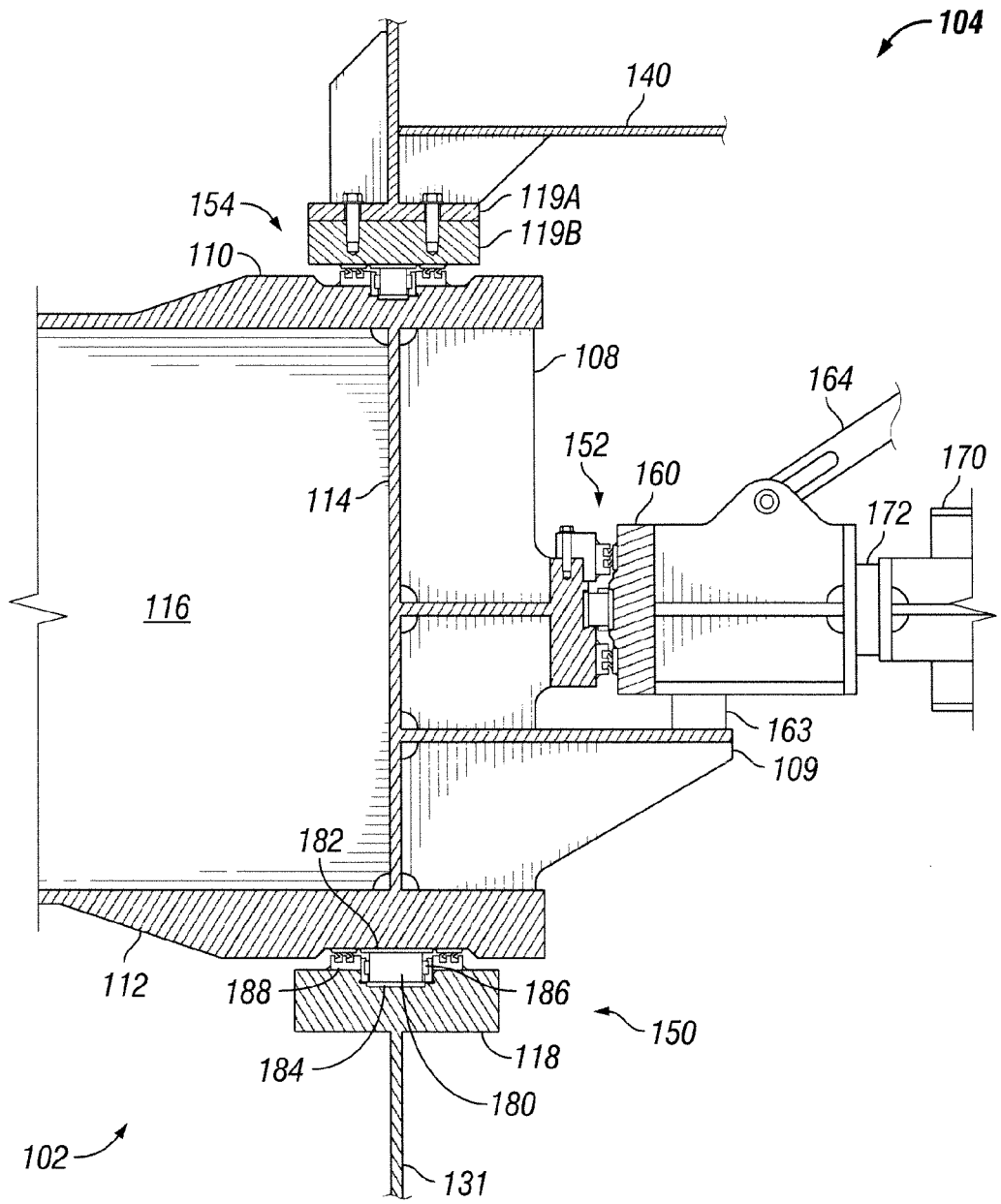
FIG. 13 is a portion of FIG. 4 enlarged to show even greater detail, showing the arrangement of three discrete roller bearings during normal operation.
Figure 14:
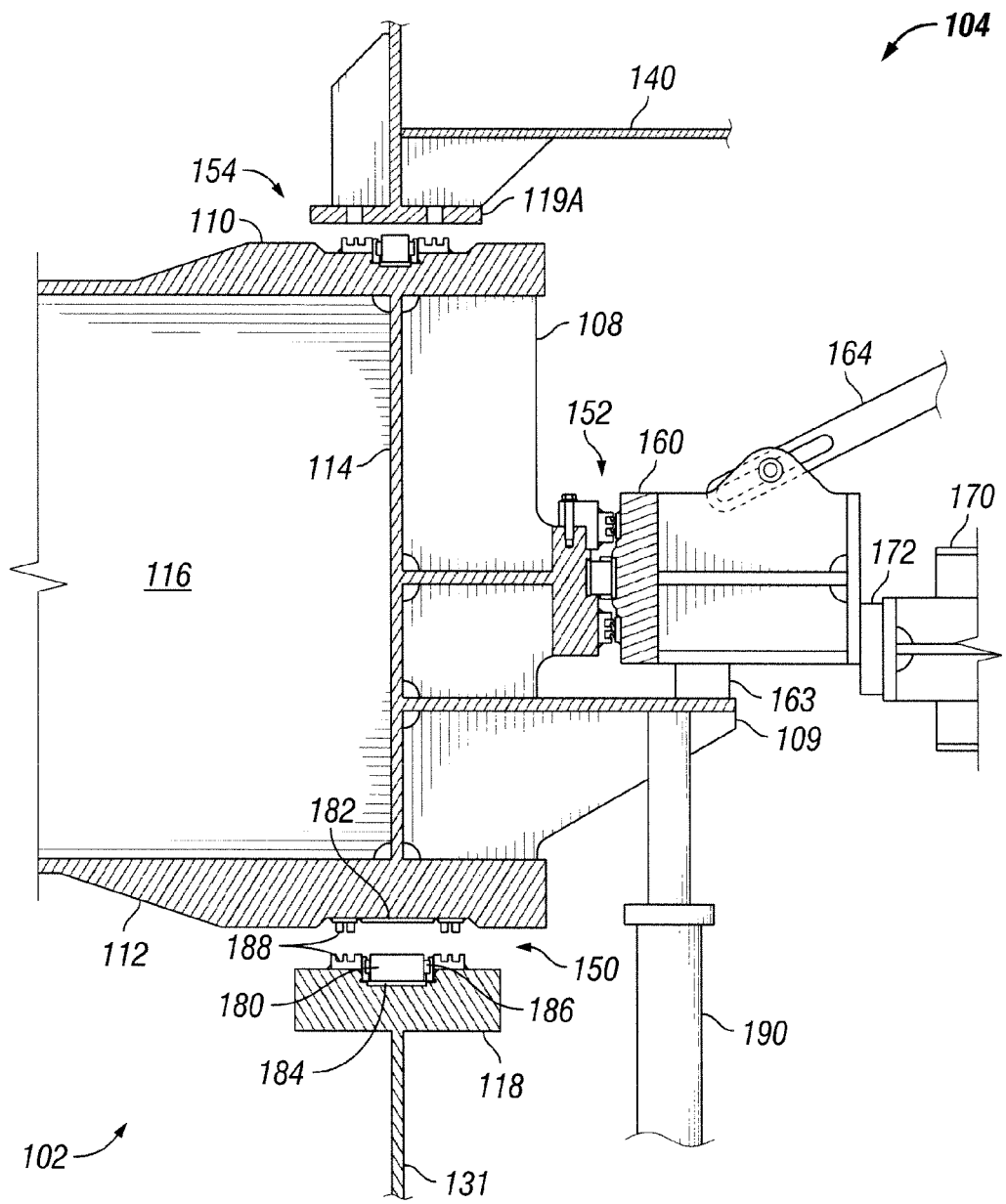
FIG. 14 is a portion of FIG. 4 enlarged to show even greater detail, showing the arrangement of three discrete roller bearings under maintenance conditions with the turret jacked up axially with respect to the vessel to expose the lower thrust roller bearing components.

A lower circular flange 118 having a tee-shaped cross-sectional profile extends upwardly from deck 120 of vessel 104 and carries lower main thrust roller bearing 150. Flange 118 includes a machined circular groove on its top surface, which receives the lower race of main bearing 150. Similarly, the bottom surface of lower flange 112 of turret 102 includes a machined circular groove, which receives the upper race of main bearing 150. This bearing structure is best seen in FIGS. 13 and 14 and is described further below. Unlike conventional pre-manufactured roller bearings which are delivered as pre-assembled units of precision rollers and races packaged within a housing, because the "housing" consists of grooves that are precisely formed within the turret and vessel flanges, the races and rollers can be selectively replaced in situ with the assurance that design tolerances will be appropriately maintained.

Similarly, the top surface of upper flange 110 of turret 102 also includes a machined circular groove, which receives the lower race of upper thrust bearing 154. An upper circular flange 119 having a tee-shaped cross sectional profile extends downwardly from cover 138 of turret support structure 132. The bottom surface of upper flange 119 includes a machined circular groove, which receives the upper race of upper thrust bearing 154. Upper vessel flange 119 is split along a horizontal plane. The upper portion is secured to turret support structure, such as be welding. The lower portion is bolted to the upper portion so as to be removable and serves a spacer that holds main bearing 150 between turret flange 112 and vessel flange 118. Accordingly, upper thrust bearing 154 is sometimes referred to as the retaining bearing. This bearing structure is best seen in FIGS. 13 and 14 and is described further below.

Although FIG. 4 illustrates a lower main thrust roller bearing 150 having a single radial row of rollers and races, a thrust roller bearing having two or more concentric rows of rollers and races may be used. For example, an inner row of rollers and races located on the inner side of the tee-shaped flange 118 and an outer row of rollers and races located on the outer side of flange 118 may be used. Such an arrangement minimizes the tendency for uneven loading of the thrust roller bearing as the tee-flange 118 flexes under forces of wind, waves, and currents. Moreover, each upper bearing race of thrust bearing 150 is significantly wider than its associated rollers allowing for a wider roller path to account for radial deflections of the turret 102 relative to the vessel 104. Each roller preferably has an axial length greater than or equal to its diameter to minimize the tendency for the roller to flip on its side when vessel 104 is radially displaced with respect to turret 102.

Mid radial bearing 152 includes an inner ring 162, which is connected to turret arm 108 and receives the inner race of roller bearing 152, and an outer ring 160, which in the embodiment of FIG. 4 is slideably supported atop a shelf 109 projecting outward from turret arm 108. A bearing pad 163, made of self lubricating bearing material or Orkot® ("Orkot" is a registered trademark of Trelleborg Sealing Solutions), for example, supports the weight of outer ring 160 on shelf 109 yet allows outer ring 160 to remain stationary with respect to vessel 104. Outer ring 160 is held stationary with respect to vessel 104 by a series of torque control arm assemblies 164 (only one of which is visible in FIG. 4), which are radially positioned between outer ring 160 and turret support structure 132. The advantage of turret 102 carrying the weight of ring 160 is to decouple any moon pool deflections due to hogging or sagging of vessel 104 from ring 160, which might otherwise produce edge loading on the radial rollers.

Vessel 104 is held in position horizontally about outer ring 160 by a radially-arranged series of spring packs 170 (only one spring pack 170 is visible in FIG. 4). As spring packs for radial turret bearings are known in the art, spring pack 170 is not discussed further herein. The primary purpose of the radial arrangement of spring packs 170 is to provide a resilience to relative movements between vessel 104 and turret 102, in particular during peak loads. As vessel 104 is translated in a horizontal direction, compressive load is put on radial bearing 152. Peak loading of the radial bearing 152 is caused by the force of wind and sea currents acting on vessel 104 and mooring, riser, and inertial loads on the turret 102 itself. A radial bearing support ring 160 ensures optimal distribution of the load on the radial rollers and in conjunction with the spring packs, which provide a resilient radial compression force to support ring 160 to help counteract radial loads from wind, waves, and currents, isolates the radial bearing 152 from vessel deflections.

A plain radial bearing pad 172, made of a self lubricating bearing material or Orkot® for example, is disposed between spring pack 170 and outer ring 160, which allows turret 104, including mid radial roller bearing 152 with its outer ring 160, to be vertically raised and lowered a small distance with respect to vessel 104 and spring pack 170 during bearing maintenance and replacement, as described more fully below with respect to FIGS. 13 and 14. Torque control min assembly 164 is similarly adapted to allow small amounts of radial and vertical movement between turret support structure 132 and outer ring 160 while arresting circumferential torque on outer ring 160. For instance, a slotted pivoting arm or similar mechanism may be used.

Figure 5:
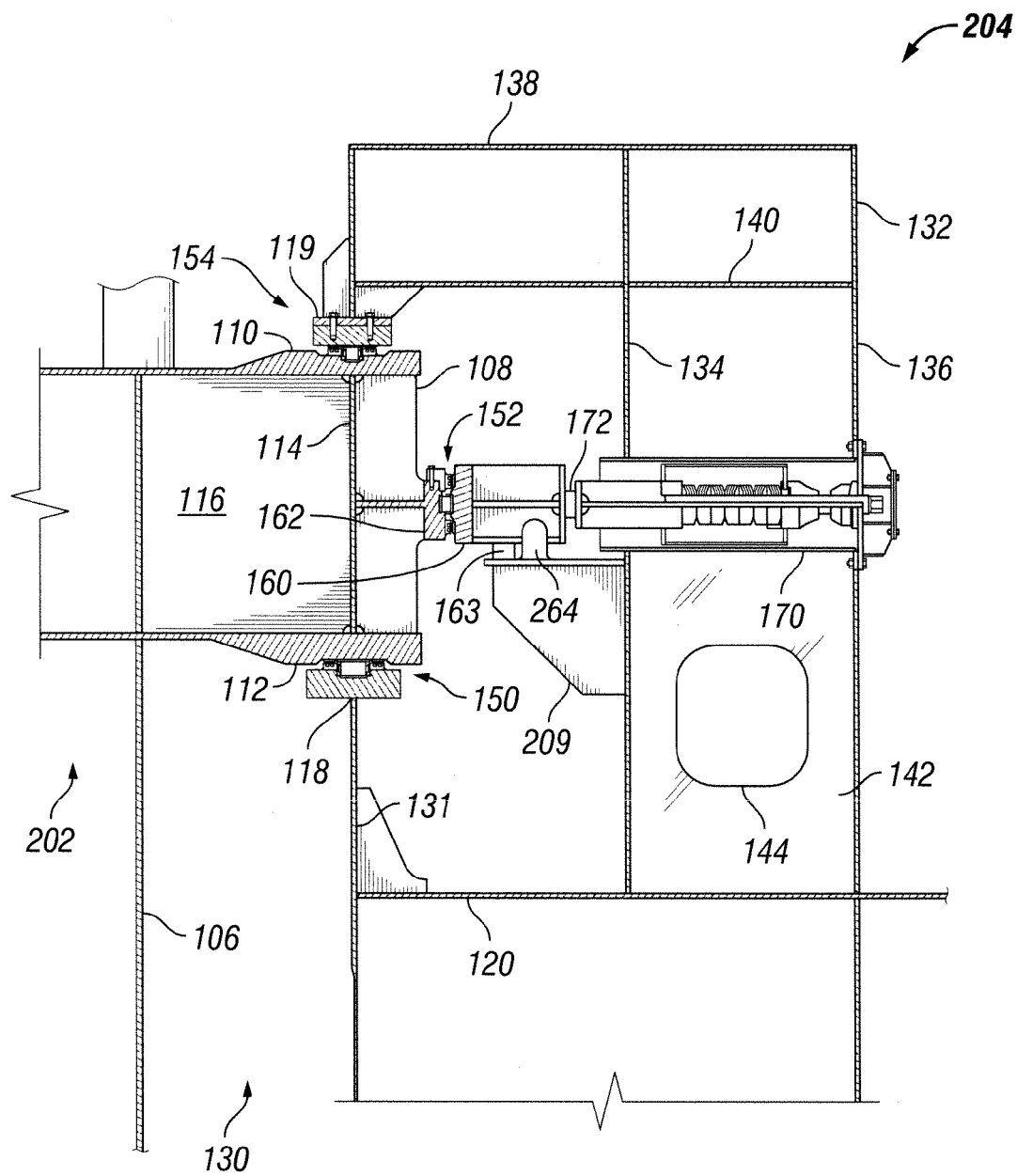
FIG. 5 is a detailed elevation in longitudinal cross-section of a portion the bow of a vessel including a turret installed in a moon pool according to a second embodiment of the invention, showing discrete upper and lower thrust bearings and a mid radial bearing, all of the roller-bearing variety, with the outer ring of the mid roller bearing being carried by the vessel.

FIG. 5 discloses a vessel-turret bearing arrangement according to a second embodiment of the invention. Turret 202 and vessel 204 of FIG. 5 are substantially similar to turret 102 and vessel 104 of FIG. 4, except that outer ring 160 of the mid radial roller bearing is carried by vessel 204 rather than turret 202. A series of shelves 209 (only one shelf 209 is visible in FIG. 5) mounted to the interior wall of concentric ring 134, such as by welding, vertically support outer ring 160. A plain bearing pad 163 disposed between outer ring 160 and shelf 209 slidingly supports outer ring 160 as vessel 204 shifts slightly into and out of coaxial alignment with turret 202 under the combined forces of wind, waves and current and the restoring force due to spring packs 170. An alternative embodiment of torque control arm assembly 264 is adapted to allow small amounts of radial and vertical movement between turret support structure 132 and outer ring 160 while arresting circumferential torque on outer ring 160.

The embodiment of FIG. 5 has an advantage over the embodiment of FIG. 4, because outer ring 160 does not slidingly revolve over turret-carried shelf 109. Accordingly, vessel-carried shelves 209 can be discrete plates rather than a continuous circular shelf 109, thereby simplifying manufacturing and reducing costs. However, support ring 160 is now subject to moon pool deflections, which may produce edge loading on the radial rollers.

Figure 6:
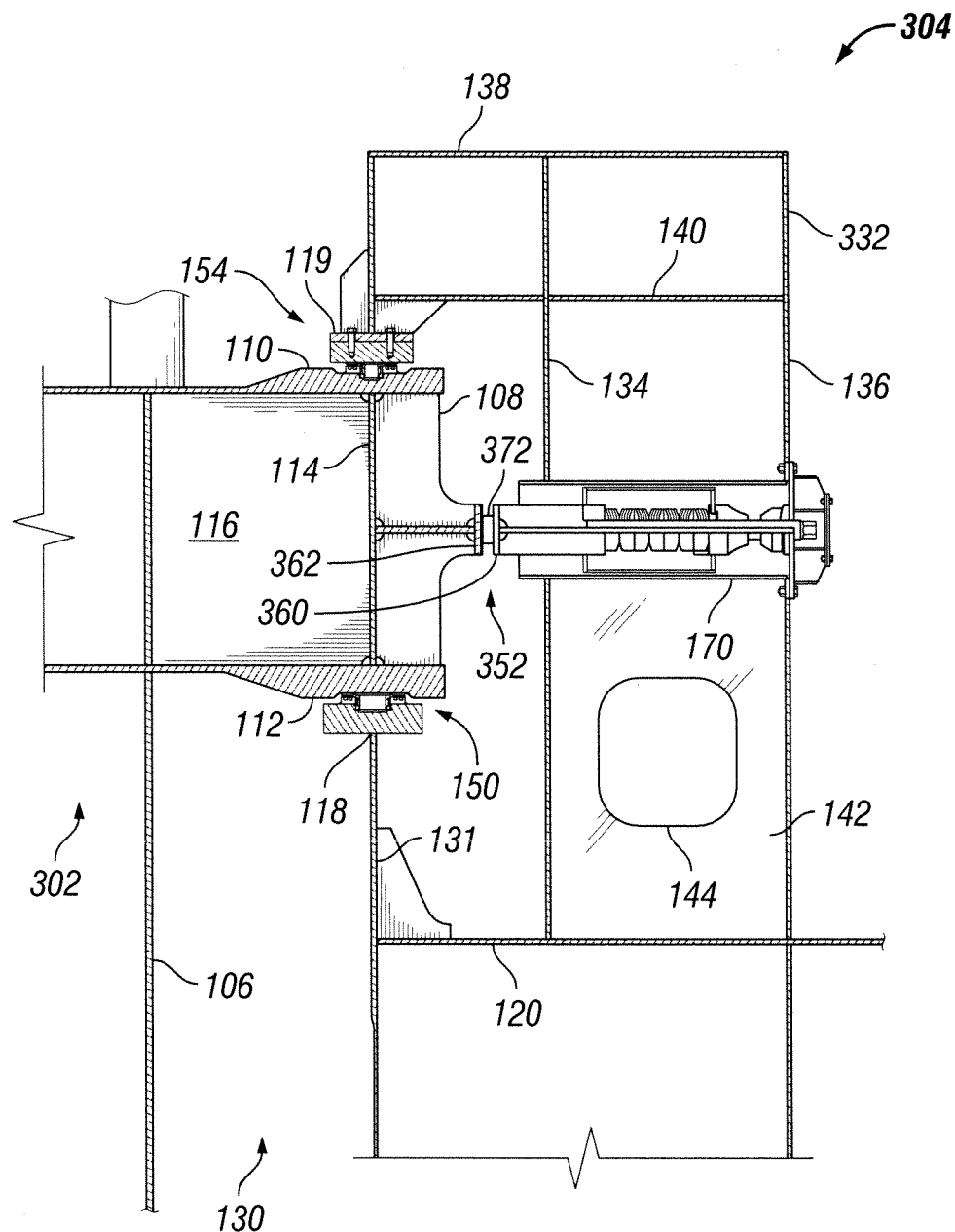
FIG. 6 is a detailed elevation in longitudinal cross-section of a portion the bow of a vessel including a turret installed in a moon pool according to a third embodiment of the invention, showing discrete upper and lower thrust bearings of the roller-bearing variety and a mid radial plain bearing with the plain bearing pad urged against the inner race by a radial spring pack.

FIG. 6 discloses a vessel-turret bearing arrangement according to a third embodiment of the invention. Like the arrangement of FIGS. 4 and 5, turret 302 and vessel 304 are rotatively coupled using a discrete lower main thrust roller bearing 150 and a discrete upper retaining thrust roller bearing 154. However, the mid radial bearing 352 is a plain bearing rather than a roller bearing. An inner circular bearing surface 362 is secured to arm 108 of turret 302, and an outer bearing surface 360 is secured to the radial series of spring packs 170. At each spring pack 170, a bearing pad 372, made of Orkot® for example, is disposed between inner and outer bearing surfaces 362, 360.

The embodiments of FIGS. 4 and 5 each in effect have two mid coaxially located radial bearings—roller bearing 152 and plain bearing pads 172. The embodiment of FIG. 6 is substantially simplified in comparison, with only plain bearing pads 372. The heavy outer ring 160 and supporting shelves 109, 209, and torque control arm assemblies 164 are eliminated. This space savings may also enable a smaller turret support structure 332. However, the embodiment of FIG. 6 is characterized by a marginal increase in turret torque, because plain bearing 352 has greater friction than roller bearing 152.

Figure 7:
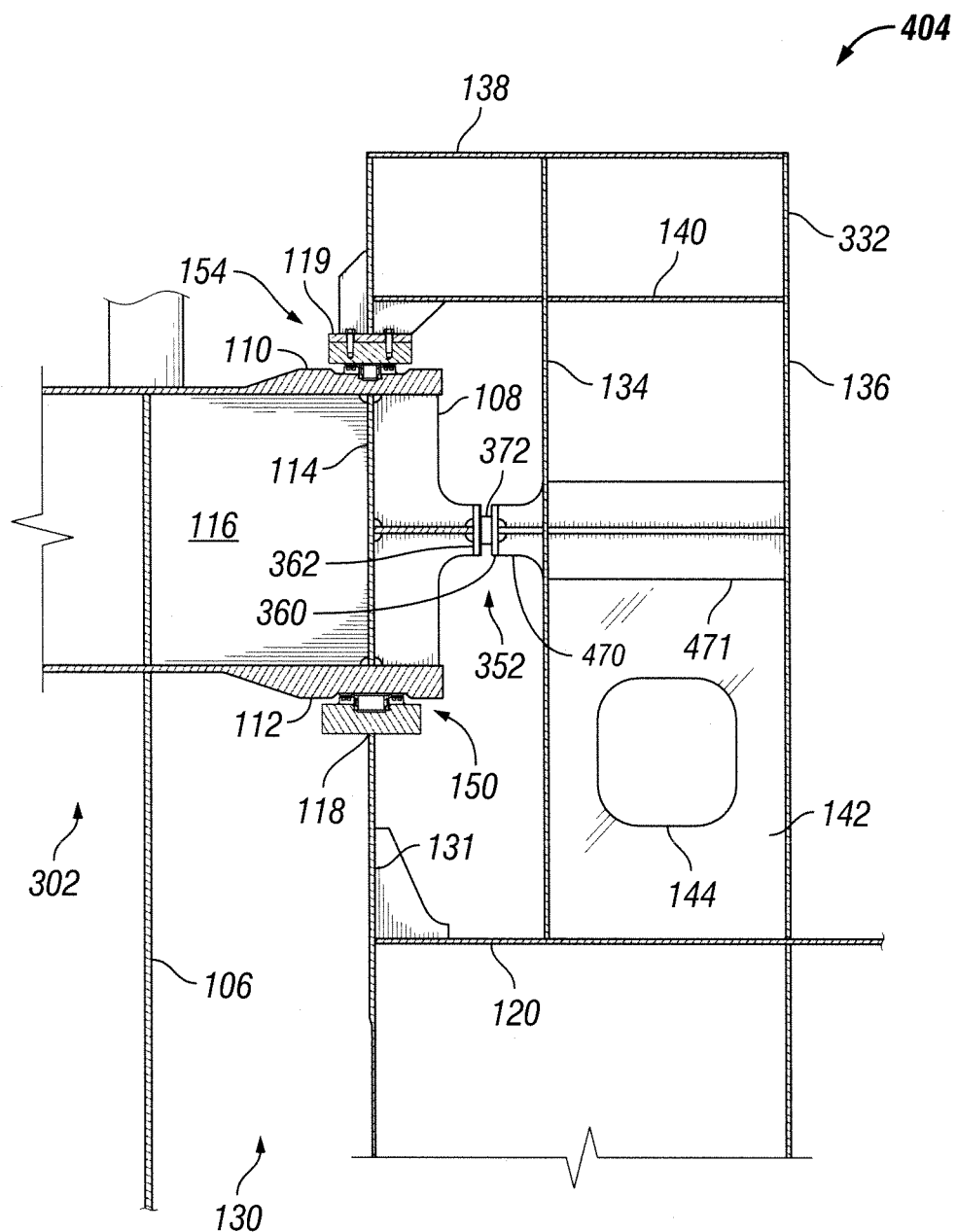
FIG. 7 is a detailed elevation in longitudinal cross-section of a portion the bow of a vessel including a turret installed in a moon pool according to a fourth embodiment of the invention, showing discrete upper and lower thrust bearings of the roller-bearing variety and a mid radial plain bearing with no spring packs.

FIG. 7 discloses a vessel-turret bearing arrangement according to a fourth embodiment of the invention. Vessel 404 of FIG. 7 is substantially similar to vessel 304 of FIG. 6, except that spring packs 170 are replaced with rigid mounts 470 for outer bearing surface 360. Mounts 470 are attached to inner concentric ring 134, such as by welding. Reinforcing structures 471, which may include horizontal and vertical plates or webs, are radially disposed between inner and outer concentric rings 134, 136 adjacent to mounts 470.

The removal of spring packs 170 simplifies construction and reduces costs, but the absence of spring packs 170 makes deflections in the shape of moon pool 130 due to hogging and sagging of vessel 404 more problematic. Ideally, gaps (not clearly visible in FIG. 7) between bearing pads 372 and inner bearing surface 362 mitigate the effects of such deflections.

According to another embodiment of the invention, the radial spring packs 170 shown in FIG. 6 are combined with the fixed radial mounts 470 shown in FIG. 7. A number of bearing pad mounts 470 are intervaled between spring packs 170. According to this embodiment, when the radial loads are average or limited, only the plain bearing pads 372 attached to the spring packs 170 are in contact with the turret. However, during peak loads both the plain bearing pads 372 attached to the spring packs 170 and the plain bearing pads 372 attached to fixed mounts 470 contact the turret, thereby limiting the required load capacity or quantity of spring packs 170.

Figure 8:
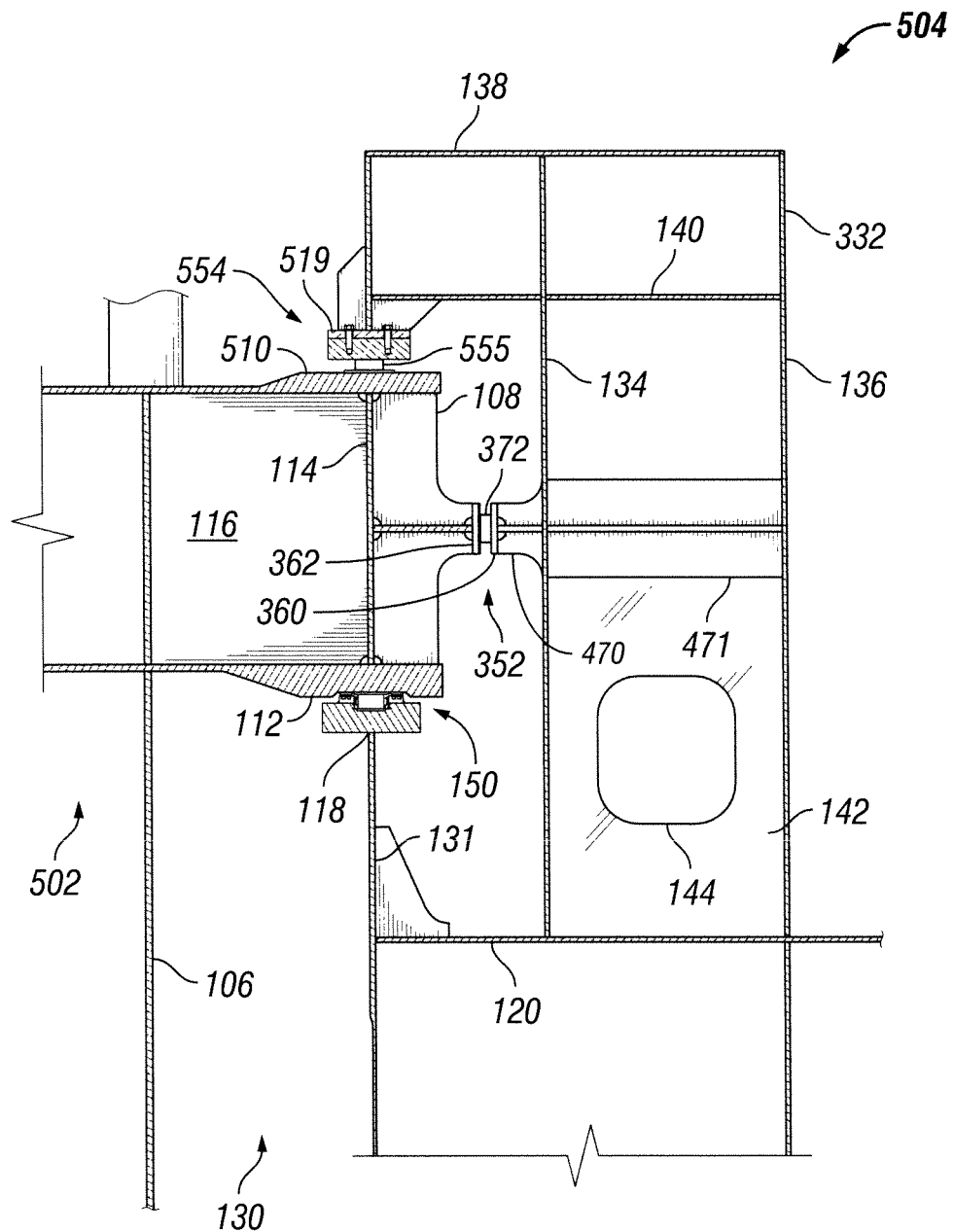
FIG. 8 is a detailed elevation in longitudinal cross-section of a portion the bow of a vessel including a turret installed in a moon pool according to a fifth embodiment of the invention, showing an upper thrust bearing and a mid radial bearing of the plain-bearing variety and a lower roller thrust bearing.

FIG. 8 discloses a vessel-turret bearing arrangement according to a fifth embodiment of the invention. Turret 502 and vessel 504 of FIG. 8 are substantially similar to turret 302 and vessel 304 of FIG. 6, except that upper retaining thrust roller bearing 154 is replaced with an upper retaining plain thrust bearing 554. Accordingly, rather than a machined groove for receiving a roller bearing race, the upper circular flange 510 of turret 502 contains an upper bearing surface upon which a circular bearing pad 555 (which may consist of discrete pad segments) bears. Likewise, upper circular flange 519 of vessel 504 is arranged for connection to plain bearing pad 555 rather than a roller bearing. Circular flange 519 retains the split upper and lower halves where the lower half is removably bolted to the upper half for replacement of bearing components, as described below with respect to FIG. 17. In cases where uplift loads are rare, the embodiment of FIG. 8 has as an advantage over the embodiment of FIG. 7 the elimination of a costly roller bearing assembly.

Figure 9:
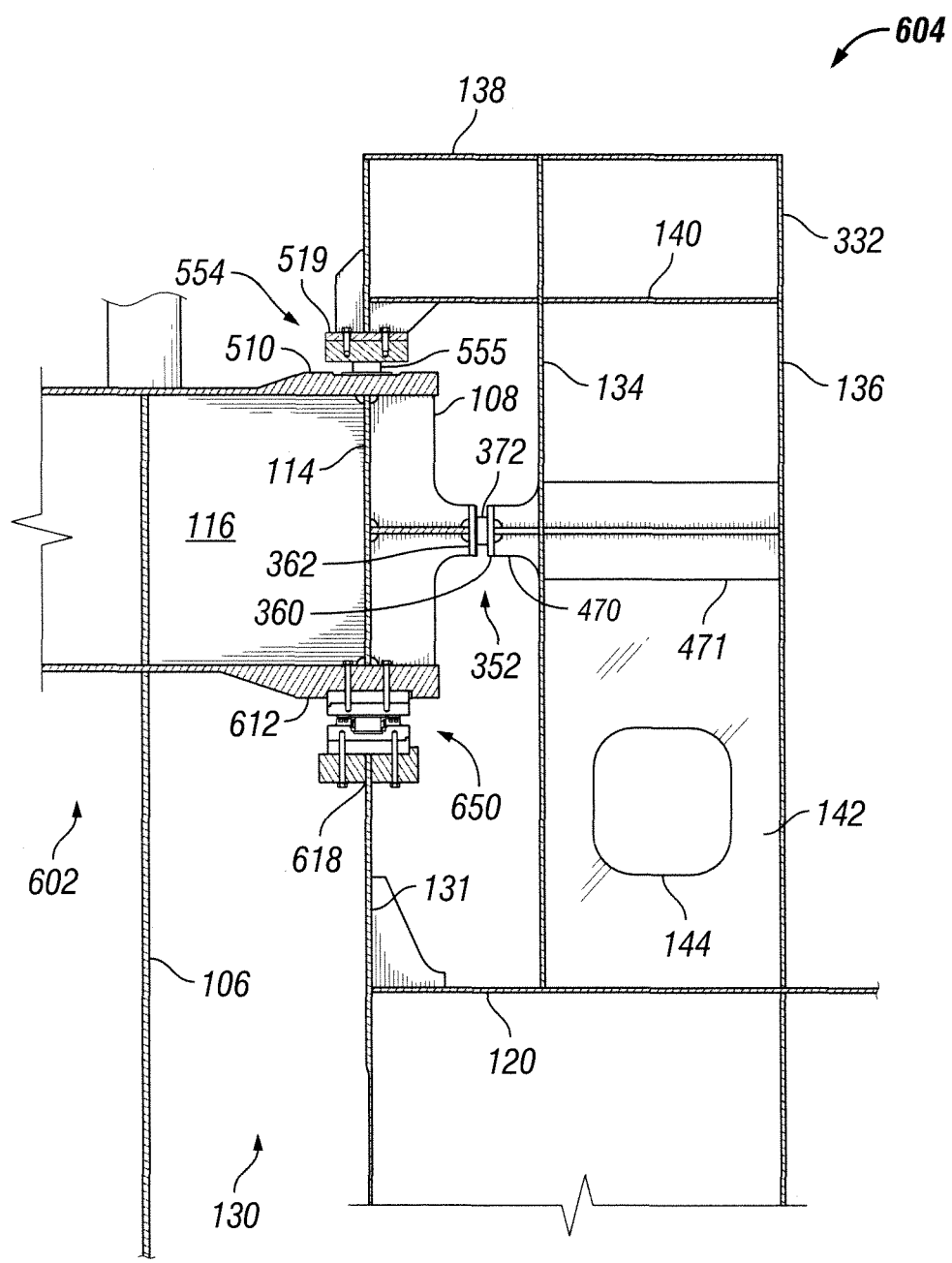
FIG. 9 is a detailed elevation in longitudinal cross-section of a portion the bow of a vessel including a turret installed in a moon pool according to a sixth embodiment of the invention, showing an upper thrust bearing and a mid radial bearing of the plain-bearing variety and a large diameter pre-manufactured lower roller thrust bearing.

FIG. 9 discloses a vessel-turret bearing arrangement according to a sixth embodiment of the invention. Turret 602 and vessel 604 of FIG. 9 are substantially similar to turret 502 and vessel 504 of FIG. 8, except the lower main roller thrust bearing 150 that includes machined circular housing grooves formed in the vessel and turret flanges 118, 112 is replaced with a completely pre-manufactured roller bearing 650 (which may consist of a plurality of discrete arcuate bearing segments) that is bolted in place between lower circular flange 612 of turret 602 and lower circular flange 618 of vessel 604. In this embodiment, not only can the individual races and rollers can be inspected or replaced in situ, but the segmented pre-manufactured housing in which the races are mounted is also replaceable in situ.

Figure 10:
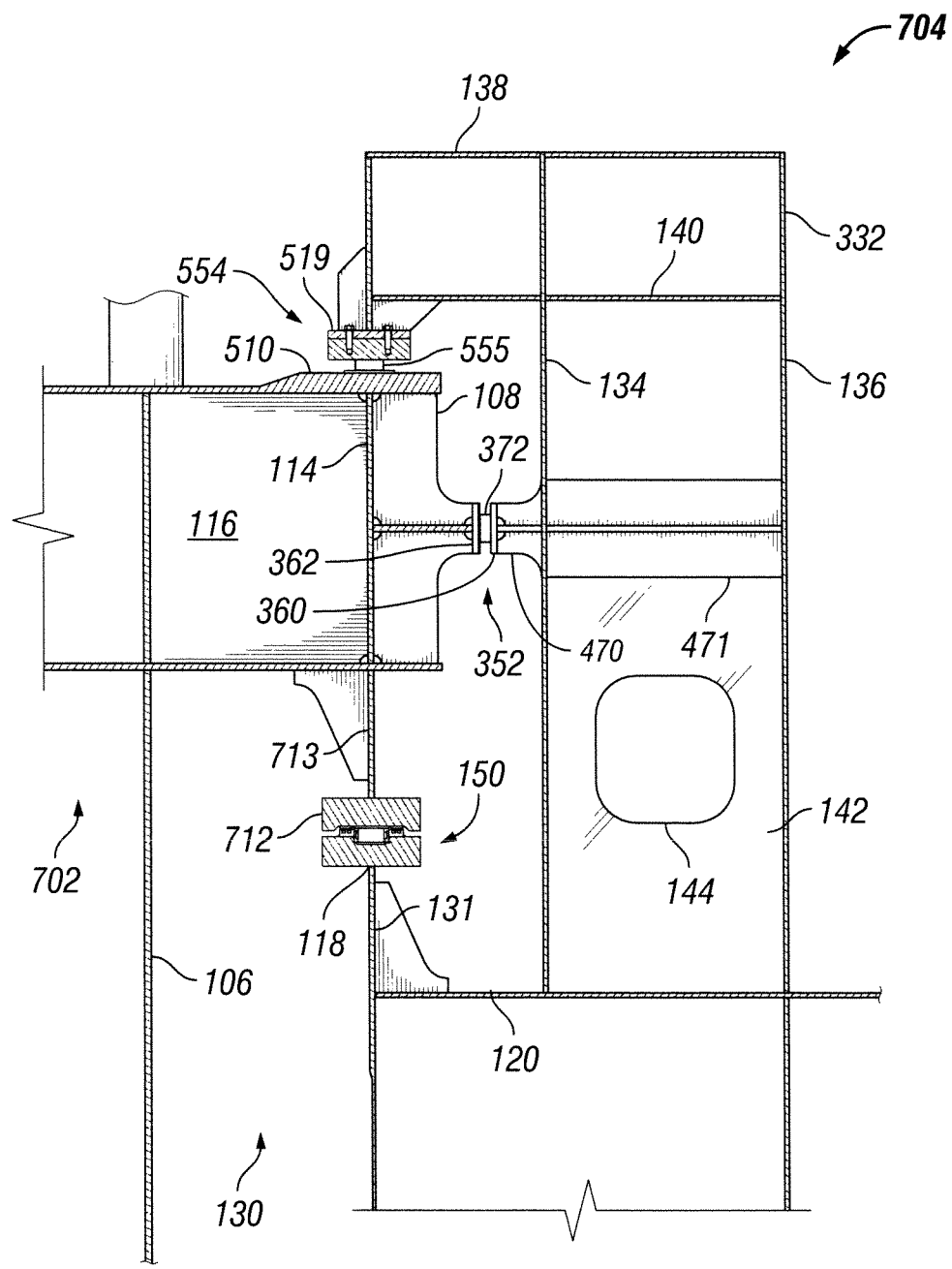
FIG. 10 is a detailed elevation in longitudinal cross-section of a portion the bow of a vessel including a turret installed in a moon pool according to a seventh embodiment of the invention, showing an upper thrust bearing and a mid radial bearing of the plain-bearing variety and a lower roller thrust bearing mounted between upper and lower tee flanges.

FIG. 10 discloses a vessel-turret bearing arrangement according to a seventh embodiment of the invention. Turret 702 and vessel 704 of FIG. 10 are substantially similar to turret 502 and vessel 504 of FIG. 8, except that circular turret arm 108 includes a concentric ring-shaped wall extending downwardly therefrom, which terminates at its lower end in a tee-shaped profile that defines a lower flange 712. The bottom surface of lower flange 712 includes a machined circular groove that receives the upper race of lower main roller thrust bearing 150. This embodiment further isolates lower main roller thrust bearing 150 from deflections within turret 702 caused by mooring, riser, and inertial loading.

Figure 11:
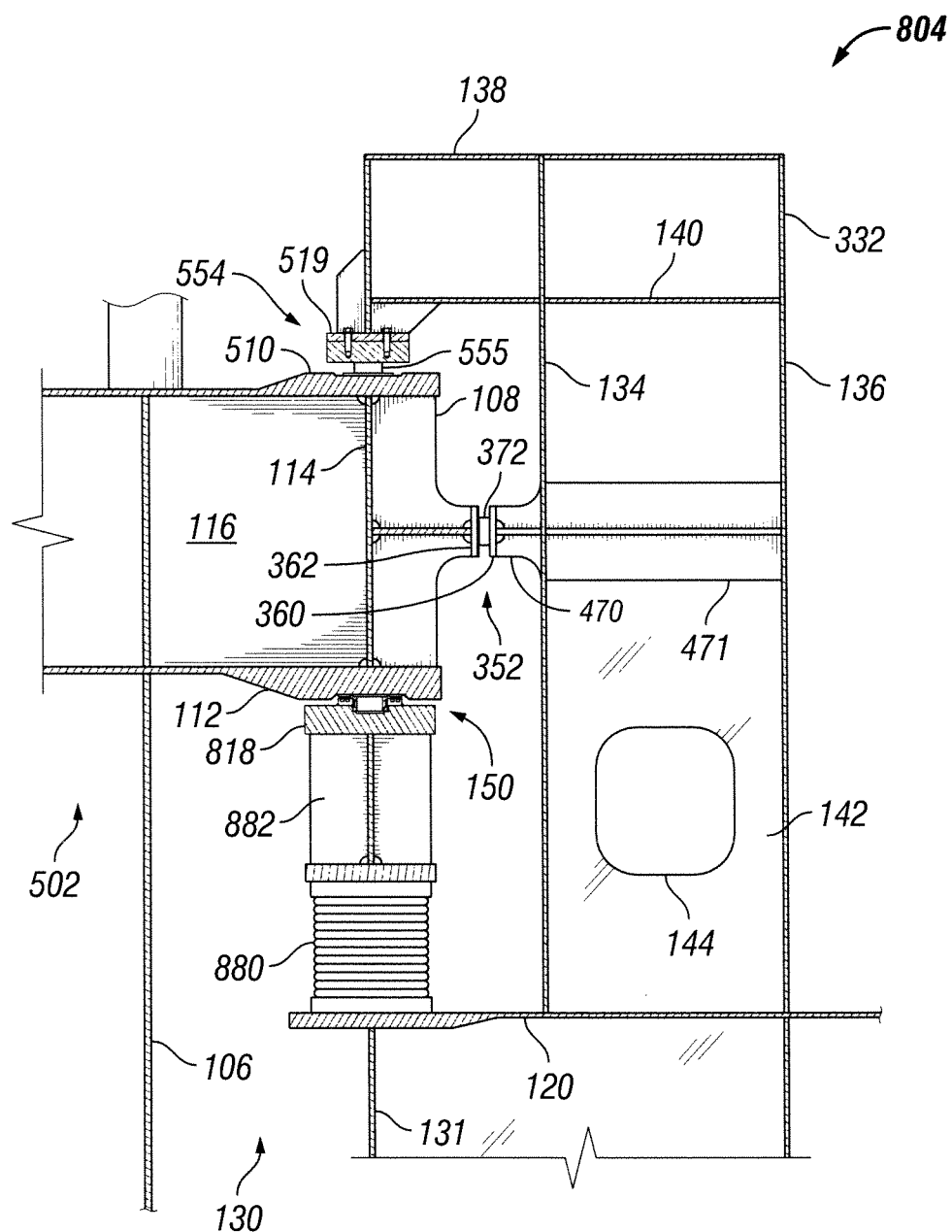
FIG. 11 is a detailed elevation in longitudinal cross-section of a portion the bow of a vessel including a turret installed in a moon pool according to an eighth embodiment of the invention, showing an upper thrust bearing and a mid radial bearing of the plain-bearing variety and a lower roller thrust bearing carried on a bearing support ring and vertical springs.

FIG. 11 discloses a vessel-turret bearing arrangement according to an eighth embodiment of the invention. Vessel 804 of FIG. 11 is substantially similar to vessel 504 of FIG. 8, except that lower main roller thrust bearing 150 is carried by a resilient mount, such as that provided by a series of spring stacks 880 arranged in a circular manner about turret 502. Spring stacks 880 sit atop deck 120 and support a lower flange 818 of vessel 804 via a support ring 882. Lower flange 818 in turn receives the lower race of roller bearing 150 into a machined circular groove formed on its top surface. Spring stacks 880 help isolate lower main roller thrust bearing 150 from deflections in vessel 804 due to wind, waves, and currents, for example.

Figure 12:
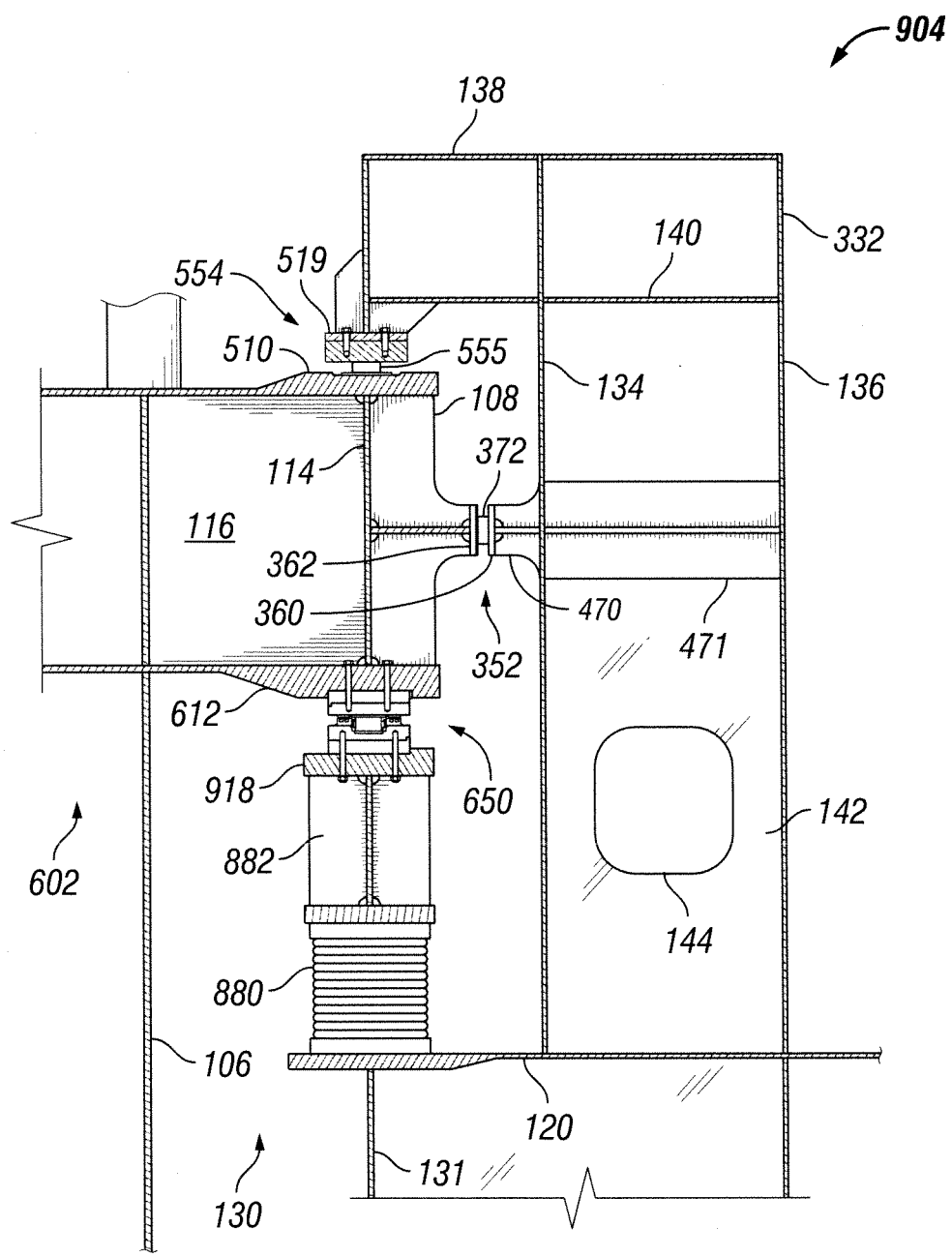
FIG. 12 is a detailed elevation in longitudinal cross-section of a portion the bow of a vessel including a turret installed in a moon pool according to a ninth embodiment of the invention, showing an upper thrust bearing and a mid radial bearing of the plain-bearing variety and a large diameter pre-manufactured lower roller thrust bearing carried on a bearing support ring and vertical springs.

Last but not least, FIG. 12 discloses a vessel-turret bearing arrangement according to a ninth embodiment of the invention, which combines features of the embodiments of FIGS. 9 and 11. Vessel 904 of FIG. 12 is substantially similar to vessel 604 of FIG. 9, except that pre-manufactured lower main roller thrust bearing 650 is carried by a resilient mount, such as that provided by a series of spring stacks 880 arranged in a circular manner about turret 602. Spring stacks 880 sit atop deck 120 and support a lower flange 918 of vessel 904 via a support ring 882. Lower flange 918 in turn bolts to the lower side of pre-manufactured roller bearing 650. Spring stacks 880 help isolate lower main roller thrust bearing 650 from vessel deflections.

FIGS. 13 and 14 show a close-up elevation in longitudinal cross-section of the arrangement of three discrete roller bearing assemblies of the first embodiment of FIG. 4. As can be seen, the main roller thrust bearing 150 includes rollers 180 (only one is visible in each of the figures) positioned between lower flange 112 of turret 102 and the lower flange 118 of vessel 104. Rollers 180 are arranged and designed to be positioned between hardened upper and lower bearing races 182, 184, which are received within the machined circular grooves of flanges 112, 118, respectively. Bearing races 182, 184 define a path for rollers 180. Upper bearing race 182 is significantly wider than the rollers 180 allowing for a wider roller path to account for radial deflections of the turret 102 relative to the vessel 104. A bearing cage assembly 186 may interval and guide rollers 180, as is well known in the art. The rollers 180, races 182, 184 and cage 186 are ideally lubricated. A seal assembly 188 keeps contaminants from entering and lubricant from exiting bearing 150. Upper roller bearing 154 and mid roller bearing 154 are structured in a manner similar to lower roller bearing 150.

FIG. 13 illustrates the three-bearing arrangement according to the first embodiment during normal operation. In contrast, FIG. 14 shows the bearing arrangement during replacement of roller thrust bearing components. The lower half 119B of upper retaining flange 119, which acts as a spacer, is removed from the upper half 119A, thereby allowing replacement of upper bearing 154 components. Next, while maintaining the heading of vessel 104, perhaps with separate station-keeping means such as tugs, turret 102 is jacked up slightly with respect to respect to vessel 104 using a radial series (only one is visible in FIG. 14) of jacks 190 or the like. Torque control arm assembly 164 and radial bearing pads 172 allow the vertical relative motion. Once turret 102 is raised, the components of lower bearing 150 may be accessed for repair or replacement.

Figure 15:
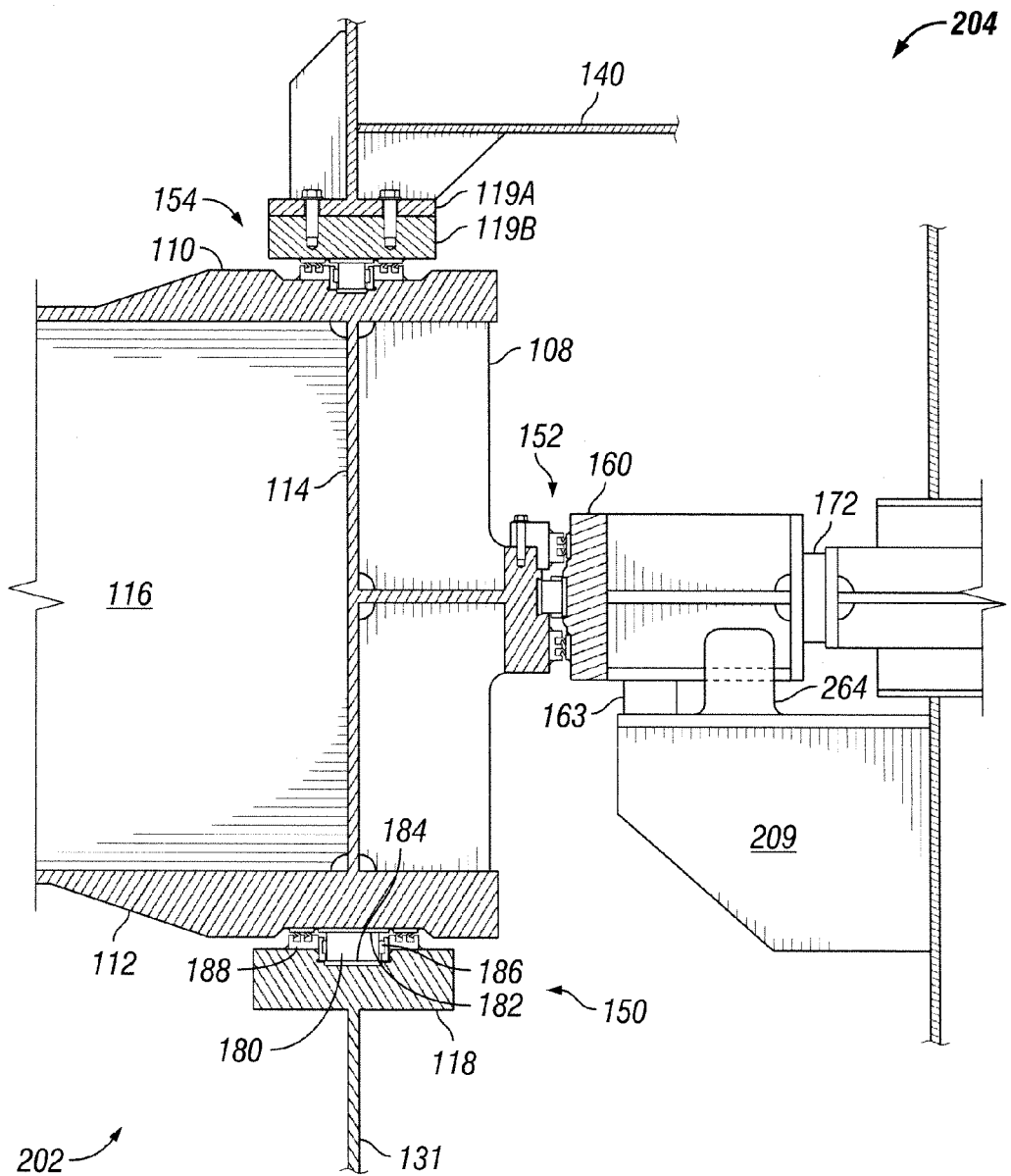
FIG. 15 is a portion of FIG. 5 enlarged to show even greater detail, showing the arrangement of three discrete roller bearings during normal operation.
Figure 16:
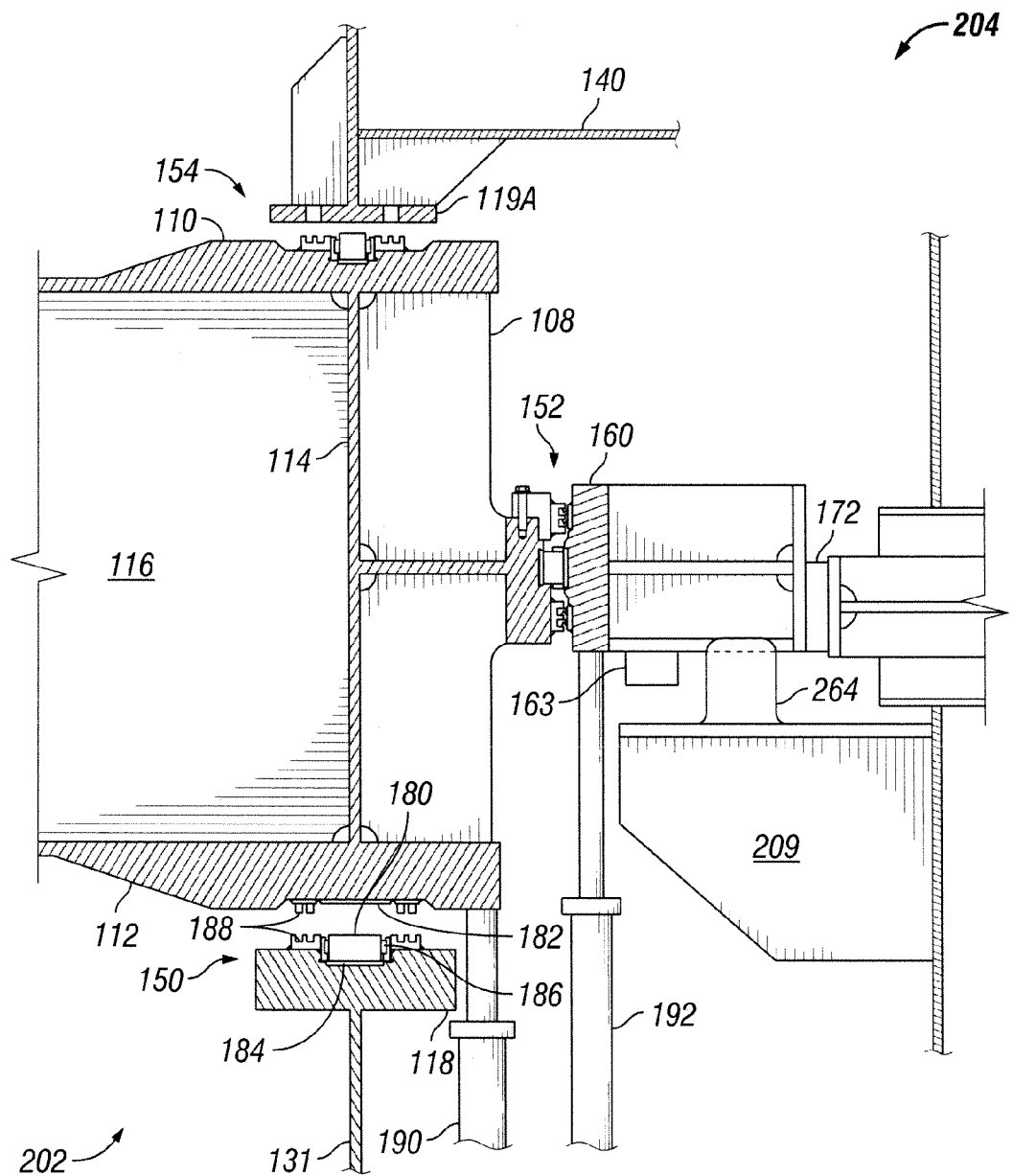
FIG. 16 is a portion of FIG. 5 enlarged to show even greater detail, showing the arrangement of three discrete roller bearings under maintenance conditions with the turret jacked up axially with respect to the vessel to expose the lower thrust roller bearing components.

FIGS. 15 and 16 show a close-up elevation in longitudinal cross-section of the arrangement of three discrete roller bearing assemblies of the second embodiment of FIG. 5. FIG. 15 illustrates the three-bearing arrangement during normal operation, while FIG. 16 shows the bearing arrangement during replacement of roller thrust bearing components. Like the previous embodiment, the lower half 119B of upper retaining flange 119 is removed from the upper half 119A, thereby allowing replacement of upper bearing 154 components. Next, while maintaining the heading of vessel 204, turret 202 is jacked up slightly with respect to respect to vessel 202 using a radial series (only one is visible in FIG. 16) of jacks 190 or the like. Torque control aim assembly 264 and radial bearing pads 172 allow this limited vertical relative motion. Because the weight of outer bearing ring 160 is not carried by turret 202, a separate series of jacks 192 are used concurrently with jacks 190 to support outer ring 160 so as not to place an axial load across radial bearing 152. Once turret 202 is raised, the components of lower bearing 150 may be repaired or replaced as appropriate.

Figure 17:
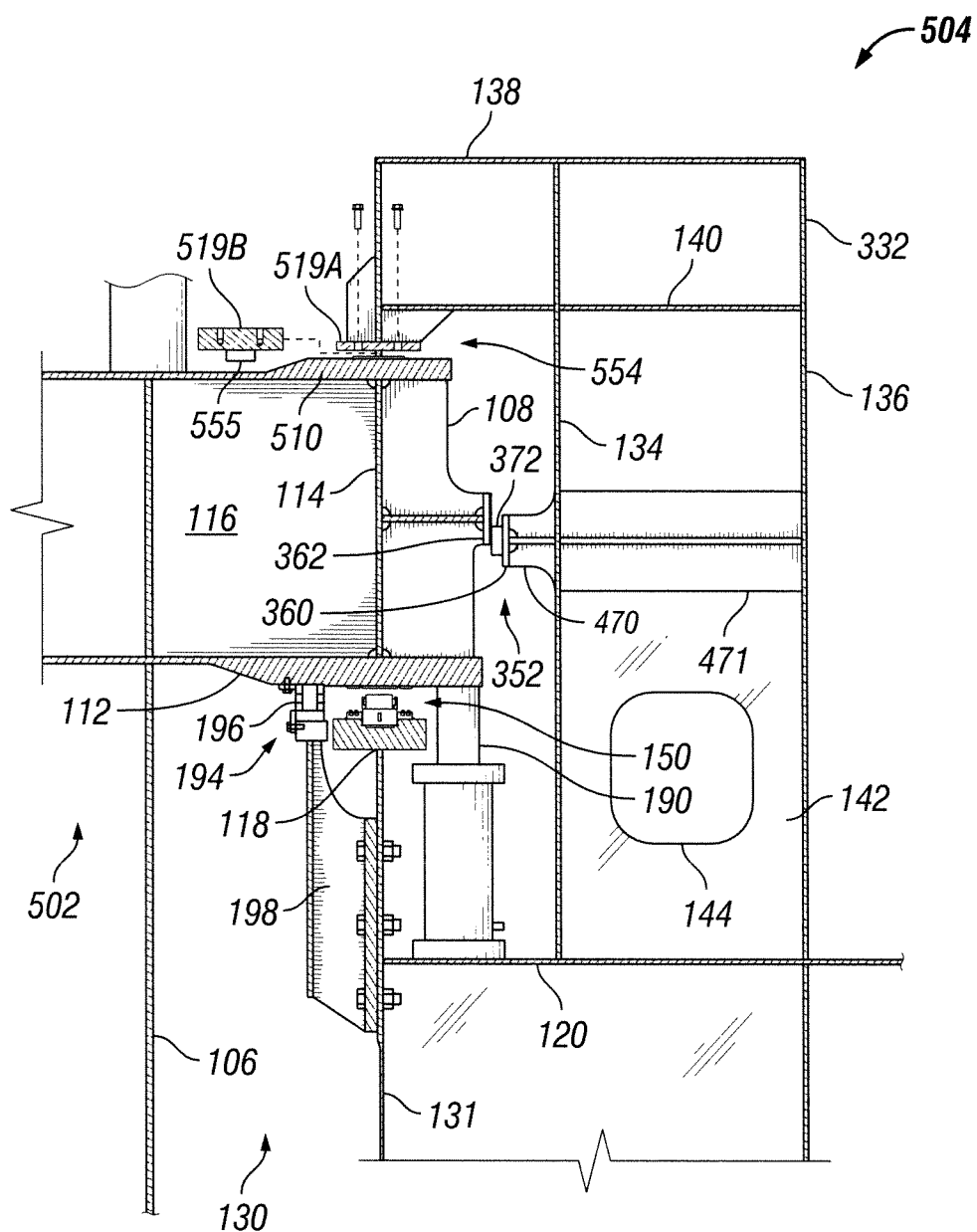
FIG. 17 is a detailed elevation in longitudinal cross-section of the embodiment of FIG. 8, shown under maintenance conditions with the turret jacked up with respect to the vessel to expose the lower thrust roller bearing components and with a temporary thrust bearing assembly installed to allow weathervaning during repair.

FIG. 17 is an exploded elevation in longitudinal cross-section that illustrates the replacement of lower roller bearing 150 of the embodiment of FIG. 8. Like the previous two examples, the lower half 519B of upper retaining flange 519 is removed from the upper half 519A, thereby allowing replacement of the components of plain upper bearing 554. Next, while maintaining the heading of vessel 504, turret 502 is jacked up slightly with respect to respect to vessel 502 using a radial series (only one is visible in FIG. 17) of jacks 190 or the like. Radial bearing pads 372 allow this limited vertical relative motion.

Although bearing 150 may be replaced while jacks 109 hold up turret 502, it is also possible to mount a temporary main thrust bearing assembly 194 to rotatively support turret 502 in the raised position. FIG. 17 shows such a bearing assembly 194 consisting series of wheels 196 each mounted atop an I-beam member 198 (only one is visible in FIG. 17). The I-beam members are mounted to moon pool bulkhead 131. Alternatively, support member 198 may be permanently fastened to moon pool bulkhead 131 such as by welding to form a continuous ring. Once temporary bearing assembly 194 is installed, jacks 190 can be lowered, allowing access to main bearing 150 while allowing vessel 504 to freely weathervane about turret 502. Once main bearing 150 is replaced, the process is reversed: Jacks 190 are raised, temporary bearing assembly 194 is removed, jacks 190 are lowered, and retaining flange 519B is reinstalled.

The temporary bearing assembly 194 may be mounted inside (as illustrated) or outside of moon pool 130. The temporary bearing 194 may bear against flange 112 of turret 502 or against another suitable member. And, bearing type other than wheels 196, including plain bearing pads and rollers, for example, may be used. Alternatively, the temporary bearing may be mounted to the turret and may bear against a member of the vessel. Finally, although the temporary bearing 194 is illustrated and discussed with respect to the embodiment of FIG. 8, a temporary bearing assembly may be used with any embodiment.

The Abstract of the disclosure is written solely for providing the United States Patent and Trademark Office and the public at large with a way by which to determine quickly from a cursory reading the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. For example, although the specification illustrates and describes upper and lower thrust bearings and a mid radial bearing, other bearing configurations, including more or fewer bearings or different elevations, may be used. Similarly a singular flange may accommodate two bearings—one on either side of the flange—rather than using two discrete flanges. Finally, although the removable spacer is described as located below the upper vessel flange and the upper thrust bearing, the spacer may be located in any suitable location between a flange and the vessel, between a flange and the turret, between a bearing and the vessel, or between a bearing and the turret. Such modifications and adaptations are in the spirit and scope of the invention as set forth herein:

What is claimed is:

1. An arrangement for connecting a turret (102) within a moon pool (30) of a vessel (104) so as to be capable of rotation about a longitudinal axis of said turret, comprising:
   a first flange (112) structurally coupled to said turret (102) defining a circular path about said longitudinal axis;
   a second flange (118) structurally coupled to said vessel (104) in concentric alignment with said circular path;
   a first thrust bearing assembly (150) for reacting against downward loads and connected between said first and second flanges so as to allow rotation of said first flange (112) with respect to said second flange (118) and to transfer an axial load from said first flange (112) to said second flange (118), said first thrust bearing assembly being a roller bearing assembly (150) that includes an upper race (182), a lower race (184), and a first set of rollers (180) disposed between and in contact with said upper and lower races with individual axes of said rollers aligned on radii of said longitudinal axis, said upper race (182), said lower race (184) and said first set rollers (180) being disposed within a first sealed volume (188);
   a second thrust bearing assembly (154) for reacting against upward loads and disposed coaxially between a third flange (110) coupled to said turret (102) and a fourth flange (119A) which is coupled to said vessel (104), said second thrust bearing assembly (154) having a second set of rollers between a second set of upper and lower races with said second set of rollers and said second set of upper and lower races being disposed within a second sealed volume which is separate and distinct from said first sealed volume (188); and
   a spacer (119B) mounted to said fourth flange (119A), said spacer (119B) serving in the load path with fourth flange (119A) for positioning said first (112) and second (118) flanges into engagement with said first thrust bearing assembly (150); wherein
   removal of said spacer (119B) from said fourth flange (119A) allows for increased separation between said first (112) and said second (118) flanges thereby allowing said first thrust bearing assembly (150) to be replaced in situ.

2. The arrangement of claim 1 wherein:
   each of said first set rollers (180) is characterized by an axial length and at least one diameter;
   said axial length is approximately equal to or greater than said diameter; and
   at least one of the group consisting of said upper race (182) and said lower race (184) has a width that is substantially wider than the axial length of each of said plurality of rollers (180).

3. The arrangement of claim 1 further comprising:
   a temporary thrust bearing assembly (194) temporarily mounted to said vessel coaxial to said longitudinal axis and axially supports said first flange (112) when said spacer (519B) is removed; whereby
   said first thrust bearing assembly (150) can be replaced in situ while said vessel is able to freely weathervane about said turret.

4. The arrangement of claim 1 wherein:
   said second thrust bearing assembly (154) is mounted to said turret (102) and axially supports said second flange (110) when said spacer (119B) is removed; whereby
   said first bearing assembly (150) can be replaced in situ while said vessel is able to freely weathervane about said turret.

5. The arrangement of claim 1 further comprising:
   a radial bearing assembly (152) coaxially disposed about said longitudinal axis between said vessel (104) and said turret (102) so as to transfer a radial load between said vessel (104) and said turret (102); wherein
   said first thrust bearing assembly (150) can be replaced without disassembly or replacement of said radial bearing assembly (152).

6. The arrangement of claim 5 wherein:
   said radial bearing assembly (152) is disposed at a first elevation that is higher than said first thrust bearing assembly (150); and
   said second thrust bearing assembly (154) is disposed at a second elevation that is higher than said first elevation.

7. The arrangement of claim 5 wherein:
   said radial bearing assembly (152) is also disposed outside of said sealed volume (188).

8. The arrangement of claim 5 wherein:
   said radial bearing assembly (152) includes an inner portion connected to said turret (102) and an outer portion connected to said vessel (104); and
   said inner portion can be axially displaced with respect to said outer portion when said spacer (119B) is removed so as to allow said first flange (112) to be further separated from said second flange (118).

9. The arrangement of claim 6 further comprising:
   a first circular groove formed in said first flange, a first of the group consisting of said upper race and said lower race being received in said first circular groove; and a second circular groove formed in said second flange, a second of the group consisting of said upper race and said lower race being received in said second circular groove.

10. The arrangement of claim 6 wherein:
    said upper and lower races are each segmented so that individual segments can be disconnected to facilitate in situ replacement.

11. The arrangement of claim 8 wherein:
    said inner portion axially slidable with respect to said outer portion while said radial bearing arrangement (152) allows rotation of said turret (102) with respect to said vessel (104) and transfers said radial load from said vessel to said turret; whereby
    said vessel (104) is enabled to freely weathervane about said turret while said first thrust bearing assembly (150) is replaced in situ.

12. The arrangement of claim 8 wherein:
    said radial bearing assembly (152) further comprises a first plain bearing pad (172) demarcating said inner portion from said outer portion, said first bearing pad (172) accommodating axial displacement of said inner portion with respect to said outer portion.

13. The arrangement of claim 8 further comprising:
    a plurality of resilient members (170) radially arranged about said longitudinal axis radially supporting said radial bearing assembly (152).

14. The arrangement of claim 12 wherein:
    said inner portion of said radial bearing assembly (152) further comprises a roller bearing assembly having an inner ring, an outer ring (160), and a plurality of rollers coaxially disposed between said inner and outer rings, said inner ring connected to said turret (102) and said outer ring (160) radially supported by said first bearing pad (172).

15. The arrangement of claim 12 further comprising:
    at least one resilient member (170) radially arranged about said longitudinal axis and connected between said vessel and said first bearing pad (172) so as to urge said first bearing pad (172) toward said inner portion.

16. The arrangement of claim 12 wherein:
said second thrust bearing assembly (154) is a roller bearing assembly including first and second circular races and a plurality of rollers radially disposed between and in contact with said first and second circular races; and
said spacer (119B) includes a circular groove formed therein that receives said first race.

17. The arrangement of claim 14 wherein:
said outer ring (160) is carried by said turret (102).

18. The arrangement of claim 14 wherein:
said outer ring (160) is carried by and rotatively fixed to said vessel in a manner that allows said outer ring (160) to be axially displaced with respect to said vessel (104) when said spacer (119B) is removed.

19. The arrangement of claim 17 further comprising:
a circular shelf (109) disposed below said outer ring (160) and structurally connected to said turret (102);
a second plain bearing pad (163) disposed between said circular shelf (109) and said outer ring (160), said circular shelf (109) axially supporting said outer ring (160) via said second bearing pad (163); and
a mechanism (164) coupled between said vessel (104) and said outer ring (160) so as to arrest rotation of said outer ring (160) with respect to said vessel (104) while allowing axial displacement of said outer ring (160) with respect to said vessel when said spacer (119B) is removed; whereby
as said vessel (104) rotates with respect to said turret (102), said outer ring (160) rotates above said circular shelf (109) and is carried by said second bearing pad (163).

20. A method for in situ replacement of a bearing (180) that rotatively couples a vessel (104) to a turret (102), comprising the steps of:
removing a spacer (119B) that secures a first flange (119A) of the vessel and a second flange (112) of the turret into engagement with a first bearing assembly (150) so as to allow for increased separation between said first and second flanges;
axially displacing said turret (102) with respect to said vessel in a first direction thereby exposing said first bearing assembly (150);
replacing said first bearing assembly (150);
axially displacing said turret (102) with respect to said vessel (104) in a second direction opposite said first direction to dispose said first and second flanges into engagement with said first bearing assembly; and
replacing said spacer (119B) thereby securing said first flange (112) and said second flange (119A) into engagement with said first bearing assembly (150).

21. The method of claim 20 further comprising the steps of:
temporarily mounting a second bearing assembly (194) between said turret (502) and said vessel (504) thereby allowing said vessel to weathervane about said turret during said step of replacing said first bearing assembly.

22. An arrangement for connecting a turret (102) within a moon pool (130) of a vessel (104) so as to be capable of rotation about a longitudinal axis of said turret, comprising:
a first flange (112) structurally coupled to said turret (104) defining a circular path about said longitudinal axis;
a second flange (118) structurally coupled to said vessel (104) in concentric alignment with said circular path;
a third flange (110) coupled to said turret (116) in concentric alignment with said circular path;
a fourth flange (119A) which is coupled to said vessel (104),
a first thrust bearing assembly (150) connected between said first and second flanges so as to allow rotation of said first flange (112) with respect to said second flange (118) and to axially transfer the weight of said turret to said vessel; and
a second thrust bearing assembly (154) for reacting against upward loads and disposed between said third flange (110) and said fourth flange (119A), and
a spacer (119B) mounted to said fourth flange (119A), said spacer (119B) serving in the load path with said fourth flange (119A) for positioning said first (112) and second (118) flanges into engagement with said first thrust bearing assembly (150), wherein
said first thrust bearing assembly (150) is a roller bearing assembly that includes an upper race (182), a lower race (184), and a plurality of elongate rollers (180) disposed between and in contact with said upper and lower races with individual axes of said rollers (180) aligned on radii of said longitudinal axis;
said upper race (182), said lower race (184) and said plurality of rollers (180) are disposed within a sealed volume;
each of said plurality of rollers is characterized by an axial length and at least one diameter, with said axial length being approximately equal to or greater than said diameter; and a second thrust bearing assembly (154) which is disposed outside of said sealed volume; wherein,
removal of said spacer (119B) from said fourth flange allows for a distance between said first (112) and second (118) flanges to be increased thereby allowing said first thrust bearing assembly (150) to be replaced in situ.

23. The arrangement of claim 22 further compromising:
a radial bearing assembly (152) coaxially disposed about said longitudinal axis between said vessel (104) and said turret (102) so as to transfer a radial load from said vessel (104) to said turret (102); wherein
said first thrust bearing assembly (150) can be replaced without disassembly or replacement of said radial bearing assembly (152).

24. The arrangement of claim 22 further comprising:
a first circular groove formed in said first flange (112), a first of the group consisting of said upper race (182) and said lower race (184) being received in said first circular groove; and
a second circular groove formed in said second flange (118), with said upper race (182) and said lower race (184) being received in said second circular groove.

25. The arrangement of claim 22 wherein:
said upper (182) and lower (184) races are each segmented so that individual segments of upper (182) and lower (184) races can be disconnected to facilitate in situ replacement.

26. The arrangement of claim 22 further comprising:
a second thrust bearing assembly (194) temporarily mounted to said vessel (504) coaxial to said longitudinal axis and axially supports said first flange (112) when said spacer (519B) is removed; whereby said first thrust bearing assembly (150) can be replaced in situ while said vessel (504) is able to freely weathervane about said turret (502).

27. The arrangement of claim 23 wherein:
said radial bearing assembly (152) is disposed at a first elevation that is higher than said first thrust bearing assembly (150); and said second thrust bearing assembly (154) is disposed at a second elevation that is higher than said first elevation.

28. The arrangement of claim 23 wherein:
said radial bearing assembly (152) includes an inner portion connected to said turret (102) and an outer portion connected to said vessel; and
said inner portion includes means for axially displacing said inner portion with respect to said outer portion when said spacer (119B) is removed so as to allow said first flange (112) to be further separated from said second flange (118).

29. The arrangement of claim 23 further comprising:
a third flange (110) connected to one of the group consisting of said turret and said vessel, said second thrust bearing assembly (154) connected to said third flange.

30. The arrangement of claim 28 further comprising:
means for axially displacing of said inner portion with respect to said outer portion while said radial bearing arrangement (152) allows rotation of said turret (102) with respect to said vessel (104) and transfers said radial load from said vessel (104) to said turret (102); whereby
said vessel is enabled to freely weathervane about said turret (102) while said first thrust bearing assembly (150) is replaced in situ.

31. The arrangement of claim 28 wherein:
said radial bearing assembly (352) further comprises a first plain bearing pad (172) demarcating said inner portion from said outer portion, said first bearing pad (372) accommodating axial displacement of said inner portion with respect to said outer portion.

32. The arrangement of claim 28 further comprising:
a plurality of resilient members radially arranged about said longitudinal axis radially supporting said radial bearing assembly.

33. The arrangement of claim 31 wherein:
said inner portion of said radial bearing assembly (352) further comprises a roller bearing assembly (152) having an inner ring, an outer ring (160), and a plurality of rollers coaxially disposed between said inner and outer rings, said inner ring connected to said turret (102 and said outer ring (160) radially supported by said first bearing pad (172).

34. The arrangement of claim 31 further comprising:
at least one resilient member radially arranged about said longitudinal axis and connected between said vessel (104) and said first bearing pad (172) so as to urge said first bearing pad (172) toward said inner portion.

35. The arrangement of claim 33 wherein:
said outer ring (160) is carried by said turret.

36. The arrangement of claim 33 wherein:
said outer ring (160) is carried by and rotatively fixed to said vessel in a manner that allows said outer ring (160) to be axially displaced with respect to said vessel when said spacer (119B) is removed.

37. The arrangement of claim 35 further comprising:
a circular shelf (209) disposed below said outer ring (160) and structurally connected to said turret;
a second plain bearing pad (163) disposed between said circular shelf (209) and said outer ring (160), said circular shelf (209) axially supporting said outer ring (160) via said second bearing pad (163); and
a mechanism means (164) coupled between said vessel and said outer ring (160) for arresting rotation of said outer ring (160) with respect to said vessel (104) while allowing axial displacement of said outer ring (160) with respect to said vessel when said spacer (119B) is removed; whereby
as said vessel (104) rotates with respect to said turret (102), said outer ring (160) rotates above said circular shelf (109) and is carried by said second bearing pad (163).

38. The arrangement of claim 29 wherein:
said second thrust bearing assembly (154) is connected to said third flange (110) by said spacer (119B).

39. The arrangement of claim 29 wherein:
said third flange (110) is connected to said one of the group consisting of said turret (202) and said vessel (204) by said spacer (119B).

40. The arrangement of claim 38 wherein:
said second thrust bearing assembly (154) is a roller bearing assembly including first and second circular races and a plurality of rollers radially disposed between and in contact with said first and second circular races; and
said spacer (119B) includes a circular groove formed therein that receives said first race.

41. The arrangement of claim 38 wherein:
said second thrust bearing assembly (154) is a plain bearing assembly (554) including a plain bearing pad (555); and
said spacer (519B) is connected to said plain bearing pad (555).

42. The arrangement of claim 26 wherein:
said second thrust bearing assembly (194) is mounted to a bulkhead (131) of said moon pool of said vessel; and
said second thrust bearing assembly (194) is characterized by a radius less than that of said first thrust bearing assembly (150).

43. The arrangement of claim 26 further comprising:
said second thrust bearing assembly (194) is characterized by a radius greater than that of said first thrust bearing assembly (150).

\* \* \* \* \*